US011188065B2

(12) United States Patent
Vedula

(10) Patent No.: US 11,188,065 B2
(45) Date of Patent: Nov. 30, 2021

(54) SYSTEM AND METHOD FOR AUTOMATED FAULT DIAGNOSIS AND PROGNOSIS FOR ROTATING EQUIPMENT

(71) Applicant: Nanoprecise Sci Corp., Edmonton (CA)

(72) Inventor: Sunil S. Vedula, Edmonton (CA)

(73) Assignee: Nanoprecise Sci Corp., Edmonton (CA)

( * ) Notice: Subject to any disclaimer, the term of this patent is extended or adjusted under 35 U.S.C. 154(b) by 1003 days.

(21) Appl. No.: 15/862,146

(22) Filed: Jan. 4, 2018

(65) Prior Publication Data

US 2019/0095781 A1   Mar. 28, 2019

Related U.S. Application Data

(60) Provisional application No. 62/562,365, filed on Sep. 23, 2017.

(51) Int. Cl.
*G06N 3/04* (2006.01)
*G06K 9/00* (2006.01)
(Continued)

(52) U.S. Cl.
CPC ........... *G05B 23/024* (2013.01); *G01H 1/003* (2013.01); *G01H 17/00* (2013.01);
(Continued)

(58) Field of Classification Search
None
See application file for complete search history.

(56) References Cited

U.S. PATENT DOCUMENTS

2011/0125419 A1*  5/2011  Bechhoefer .......... F03D 7/047
                                         702/34
2015/0070190 A1   3/2015  Fong et al.
(Continued)

FOREIGN PATENT DOCUMENTS

CN   103308292 A   9/2013
CN   104316317 A   1/2015
(Continued)

OTHER PUBLICATIONS

Lei et al., "EEMD method and WNN for fault diagnosis of locomotive roller bearings" Expert Systems with Applications 38 (2011) 7334-7341 (Year: 2011).*
(Continued)

*Primary Examiner* — John C Kuan
(74) *Attorney, Agent, or Firm* — Wolf, Greenfield & Sacks, P.C.

(57) ABSTRACT

Techniques, including systems and methods for monitoring a rotating equipment, are provided. A sensor that is in proximity of the rotating equipment senses vibrations of the rotating equipment. The sensor generates a digital signal corresponding to the vibrations of the rotating equipment and transmits the digital signal over a communication network. A server receives the digital signal and pre-processes the digital signal using ensemble empirical mean decomposition (EEMD) technique. The server processes the digital signal using wavelet neural network (WNN) to detect faults in the rotating equipment. Further, the server processes the digital signal using the wavelet neural network to predict remaining useful life (RUL) of the rotating equipment.

17 Claims, 10 Drawing Sheets

(51) Int. Cl.
*G01H 1/00* (2006.01)
*G05B 23/02* (2006.01)
*G01H 17/00* (2006.01)
*G06K 9/62* (2006.01)
*G06N 20/00* (2019.01)

(52) U.S. Cl.
CPC ..... *G05B 23/0283* (2013.01); *G06K 9/00516* (2013.01); *G06K 9/00523* (2013.01); *G06K 9/00536* (2013.01); *G06K 9/6284* (2013.01); *G06N 3/0481* (2013.01); *G06N 20/00* (2019.01)

(56) References Cited

U.S. PATENT DOCUMENTS

| 2015/0226603 | A1* | 8/2015 | Hedin | G01M 13/028 |
| | | | | 702/39 |
| 2016/0245686 | A1* | 8/2016 | Pal | G01H 1/003 |

FOREIGN PATENT DOCUMENTS

| CN | 104748961 | A | | 7/2015 |
| CN | 105424366 | A | | 3/2016 |
| CN | 106052998 | A | * | 10/2016 |
| CN | 106197999 | A | | 12/2016 |
| CN | 106441888 | A | | 2/2017 |
| CN | 106990303 | A | | 7/2017 |
| CN | 107122802 | A | | 9/2017 |
| EP | 1298511 | A1 | | 4/2003 |
| WO | WO 2016/053748 | A1 | | 4/2016 |

OTHER PUBLICATIONS

Mahamad et al., "Predicting remaining useful life of rotating machinery based artificial neural network" Computers and Mathematics with Applications 60 (2010) 1078-1087 (Year: 2010).*
Chen et al., "Mechanical State Prediction Based on LSTM Neural Network" Proceedings of the 36th Chinese Control Conference Jul. 26-28, 2017, Dalian, China (Year: 2017).*
Korkua et al., "Wireless Health Monitoring System for Vibration Detection of Induction Motors" IEEE 2010 (Year: 2010).*
International Search Report and Written Opinion dated Dec. 5, 2018 in connection with International Application No. PCT/CA2018/000177.
Osman et al., A morphological Hilbert-Huang transform technique for bearing fault detection. IEEE Transactions on Instrumentation and Measurement. Nov. 2016; 65(11):2646-56.
Vachtsevanos et al., Fault Prognosis Using Dynamic Wavelet Neural Networks. Autotestcon Proceedings. IEEE Systems Readiness Technology Conference. 2001; 857-870.
Wu et al., Induction machine fault detection using SOM-based RBF neural networks. IEEE Transactions on Industrial Electronics. Feb. 2004; 51(1):183-94.
Yaqub et al., Optimally Parameterized Wavelet Packet Transform for Machine Residual Life Prediction. Proceedings of Acoustics. Nov. 2-4, 2011; vol. 2; 8 pages.
Zhang et al., Fault diagnosis and prognosis using wavelet packet decomposition, Fourier transform and artificial neural network. Journal of Intelligent Manufacturing. Dec. 1, 2013; 24(6):1213-27.
Zhang et al., Fault Diagnosis From Raw Sensor Data Using Deep Neural Networks Considering Temporal Coherence. Sensors. Mar. 9, 2017; 17(3):549. *Abstract; Section 1; Section 3.1.1; Figure 3.
Extended European Search Report for European Application No. EP 18859348.7 dated Jun. 1, 2021.
Iyer et al., Analysis of acoustic signals from rotating machines for wear detection. 2014 International Conference on Recent Trends in Information Technology. Apr. 10, 2014:1-6.
Li et al., Recent progress on decoupling diagnosis of hybrid failures in gear transmission systems using vibration sensor signal: A review. Measurement. Aug. 1, 2016;90:4-19.
Malik et al., Artificial neural network and empirical mode decomposition based imbalance fault diagnosis of wind turbine using TurbSim, FAST and Simulink. IET Renewable Power Generation. May 2017;11(6):889-902.
Rai et al., Bearing fault diagnosis using FFT of intrinsic mode functions in Hilbert-Huang transform. Mechanical Systems and Signal Processing. Aug. 1, 2007;21(6):2607-15.
Sakthivel et al., Vibration based fault diagnosis of monoblock centrifugal pump using decision tree. Expert Systems with Applications. Jun. 1, 2010;37(6):4040-9.
Teti et al., Advanced monitoring of machining operations. CIRP annals. Jan. 1, 2010;59(2):717-39.
Yan et al., Hilbert-Huang transform-based vibration signal analysis for machine health monitoring. IEEE Transactions on Instrumentation and measurement. Nov. 20, 2006;55(6):2320-9.
Zhang et al., Comprehensive overview on computational intelligence techniques for machinery condition monitoring and fault diagnosis. Chinese Journal of Mechanical Engineering. Jul. 2017;30(4):782-95.

* cited by examiner

SYSTEM AND METHOD FOR AUTOMATED FAULT DIAGNOSIS AND PROGNOSIS FOR ROTATING EQUIPMENT

RELATED APPLICATION

This non-provisional application claims priority to U.S. Prov. App. No. 62/562,365, entitled "An architecture (VibrationLF) for lowest powered wireless sensors driven fault diagnosis and remaining life prediction", filed Sep. 23, 2017, the contents of which are hereby incorporated by reference herein in its entirety.

TECHNICAL FIELD

The present techniques relate generally to the field of condition monitoring of a rotating equipment and more particularly, to a system and method for automated fault diagnosis and prognosis for the rotating equipment.

BACKGROUND

Rotating equipment is widely used in the industry. For example, gas compressors, generators, turbines, pumps, fans, blowers, and gear boxes are examples of commonly deployed rotating equipment. Rotating equipment can include a motor, a generator, a shaft, a gear box, a bearing, and/or a load. Any fault in the rotating equipment and/or its various components can cause the entire machine to break down, which can lead to various consequences, such as schedule delays, high production cost, and/or injuries to operators.

Conventionally, new rotating equipment is installed, maintained, and repaired at regularly scheduled intervals. Trade-offs between the cost of unscheduled machine breakdown and the cost of unnecessary maintenance is, therefore, typically inevitable. Therefore, industries may focus on diagnosis of faults in the rotating equipment. However, diagnostics alone are typically not enough to detect symptoms of equipment failure and/or to avoid any subsequent damage. For example, by diagnosing faults in the rotating equipment, it can be possible to determine faults that are occurring in the rotating equipment at a particular time instance. However, it is difficult, if not impossible, to estimate when the rotating equipment will fail based just on the faults and/or damage in the rotating equipment under observation. Determining when the rotating equipment will fail can be important to avoid damage. When the failure of the rotating equipment can be predicted in advance, catastrophes can be avoided, and predictive maintenance can be implemented to maximize running time and minimize maintenance costs of the rotating equipment.

Another problem is that data derived from the rotating equipment is not readily useful, as it is often affected by background noise present therein, especially in case of early faults. As a result, such data degrades the accuracy of diagnosing faults and/or estimating the time-to-failure of the rotating equipment.

Therefore, there exists a need for diagnosing faults and predicting the time-to-failure of the rotating equipment to implement predictive maintenance. Moreover, there exists a need for improvement of existing prediction techniques so that the time-to-failure of the rotating equipment can be predicted with enhanced accuracy.

SUMMARY

In some embodiments of the present techniques, a system for monitoring a rotating equipment is provided. The system includes a sensor positioned in proximity of the rotating equipment and configured to sense vibrations thereof. The sensor generates a digital signal corresponding to the vibrations of the rotating equipment. The sensor transmits the digital signal over a communication network. The system further includes a server that is in communication with the sensor over the communication network. The server receives the digital signal from the sensor over the communication network. The server determines a plurality of intrinsic mode functions based on the digital signal. An intrinsic mode function represents an oscillatory mode that is embedded in the digital signal. The server selects a set of intrinsic mode functions from the plurality of intrinsic mode functions and extracts a set of features from the set of intrinsic mode functions. The server applies the set of features as input values to a wavelet neural network. The server then predicts life percentage of the rotating equipment using the wavelet neural network and the applied set of features.

According to some examples, the sensor is a micro-electromechanical system (MEMS) based sensor that includes a microcontroller to convert a vibration signal to the digital signal. Further, the sensor includes a communication module that is optically configured to establish a connection with the communication network. The set of features includes a combination of time-domain features and frequency-domain features. The server applies the set of features as input values to the wavelet neural network to predict the life percentage of the rotating equipment. Further, the server calculates remaining useful life of the rotating equipment and displays the remaining useful life of the rotating equipment on a user interface of a user device.

BRIEF DESCRIPTION OF THE DRAWINGS

The accompanying drawings illustrate the various embodiments of systems, methods, and other aspects of the techniques. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Figure 1:
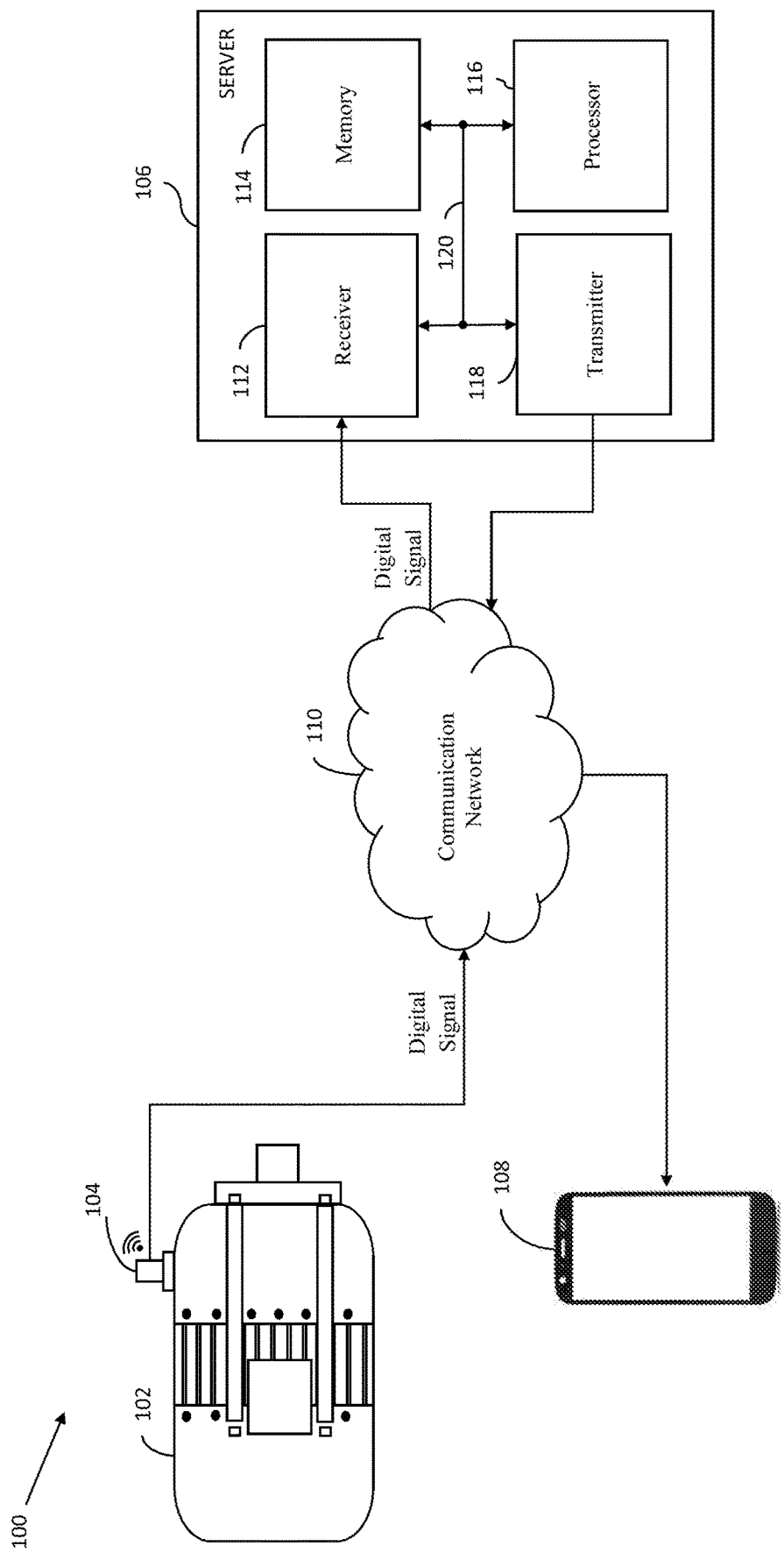
FIG. 1 is a block diagram that illustrates a system environment for a system for monitoring a rotating equipment, in accordance with the techniques described herein.

Further areas of applicability of the present techniques will become apparent from the detailed description provided hereinafter. It should be understood that the detailed description of exemplary embodiments are intended for illustration purposes only and are, therefore, not intended to necessarily limit the scope of the techniques described herein.

DETAILED DESCRIPTION

Before describing the techniques in detail, it should be observed that the present techniques utilize a combination of system components, which constitutes a system for automating fault diagnosis and prognosis for a rotating equipment. Accordingly, the components and the method steps have been represented, showing details that are pertinent for an understanding of the present technique so as not to obscure the disclosure with details that will be readily apparent to those with ordinary skill in the art having the benefit of the description herein. As required, detailed embodiments of the present technique are disclosed herein; however, it is to be understood that the disclosed embodiments are merely exemplary of the technique, which can be embodied in various forms. Therefore, specific structural and functional details disclosed herein are not to be interpreted as limiting, but merely as a basis for the claims and as a representative basis for teaching one skilled in the art to variously employ the present technique in virtually any appropriately detailed structure. Further, the terms and phrases used herein are not intended to be limiting but rather to provide an understandable description of the technique.

One way to estimate when a rotating equipment will fail is to estimate a remaining useful life (RUL) or time-to-failure. The RUL of the rotating equipment is often an important parameter that helps improve system planning and operation of the rotating equipment. The RUL, e.g., with some certainty and/or within some acceptable tolerance in the system planning, can lead to more efficient use of the rotating equipment. This can lead to, for example, more efficient production, less down times, less inventory size, fewer faults and/or smooth system upgrades. Moreover, consideration of the RUL in the system planning can avoid sudden breakdowns while the rotating equipment is in operation.

If the RUL, or time-to-failure, of the rotating equipment can be determined within certain acceptable error limits, it can lead to early replacement planning, which might lead to cost savings and/or avoid sudden machine breakdown. The time-to-failure of the rotating equipment may represent a totally non-functioning state of the rotating equipment, for example, equipment failure. The time-to-failure of the rotating equipment can also represent a state of the equipment wherein the equipment no longer yields expected results. As another example, the time-to-failure of the rotating equipment may be represent when the equipment reaches a condition of imminent failure.

It is desirable to develop techniques for predicting and/or estimating the RUL of the various types of rotating equipment. One approach for predicting the RUL is to employ a data-driven approach that uses data tracked in specific time intervals. This data can be produced, for example, by tracking the rotating equipment behavior via sensor outputs during normal operation up until a time-to-failure of the rotating equipment. The data can be pre-processed to reduce the background noise, the errors of measurement systems, to acquire more useful information and/or improve the signal-to-noise ratio.

A data-driven approach can be beneficial when mechanical principles are not straightforward and/or when mechanical systems are complex. Considering that the rotating equipment suffers from nonlinearity, stochasticity, and non-stationary degradation processes, the data-driven method can be suitable for estimating the RUL of the rotating equipment. Using a set of these observations, prediction models can be employed to recognize the trends and predict the RUL of the rotating equipment. However, prediction models often require prior knowledge of run-to-end data of equipment under test. Such run-to-end data of equipment's RUL is often difficult to obtain. For example, when the observed system is complex, expensive, and/or safety guidelines need to be observed, faults will typically be repaired before they lead to end of the RUL of the rotating equipment. This can thus deprive the data-driven approach from information necessary to predict the RUL of the rotating equipment with desired accuracy.

Therefore, there exists a need for accurately predicting the RUL and/or time-to-failure of equipment. Being able to do so can provide for continuous in-process monitoring, detecting, and/or indicating failure modes prior to the failures of the rotating equipment. Such techniques can minimize unpredicted failures, reduce maintenance costs, and/or increase machine availability. Moreover, when the RUL is predicted in advance, catastrophes can be avoided, and predictive maintenance can be implemented to maximize the rotating equipment running time and minimize the maintenance costs. Thus, there exists a need for a solution that solves the above-mentioned technical problems. Such techniques can also, or alternatively, be used to continuously develop and improve the current RUL prediction techniques.

Referring to FIG. 1, a block diagram that illustrates a system environment 100 for automated fault diagnosis and prognosis for a rotating equipment 102, according to the techniques described herein, is shown. The system environment 100 includes a wireless sensor 104, a server 106, and a user device 108 that communicate with each other by way of a communication network 110. Examples of the communication network 110 include, but are not limited to, wireless fidelity (Wi-Fi) network, a light fidelity (Li-Fi) network, a satellite network, the internet, a mobile network such as a cellular data network, high speed packet access (HSPA), or any combination thereof.

The rotating equipment 102 can be a device or a machine that has a rotatable component. In some embodiments, the rotating equipment 102 can be any mechanical equipment in industry, such as mechanical equipment that includes a motor, a shaft, a gear box, a bearing, and/or a load. For example, the rotating equipment 102 can be a gas compressor, a generator, a turbine, a pump, a fan, a blower, or a gear box.

The wireless sensor 104 can be a device, module, and/or subsystem that detects vibrations of the rotating equipment 102 and transmits digital signals corresponding to the vibrations of the rotating equipment 102 to the server 106 by way of the communication network 110. For example, the wireless sensor 104 is a MEMS (Micro-Electro-Mechanical-System) sensor. In FIG. 1, only one wireless sensor 104 is shown for illustrative purposes. The system environment 100 may include a plurality of wireless sensors. For example, the plurality of wireless sensors may be used to monitor a turbine having multiple rotating components, such as a motor, a bearing, and a shaft. The wireless sensor 104 is described in detail in conjunction with FIG. 2.

The server 106 can be a data processing system that processes the digital signals corresponding to the vibrations of the rotating equipment 102. The server 106 detects the faults and predicts a remaining useful life (RUL) of the rotating equipment 102 using the processed data. The server 106 receives the digital signals corresponding to the vibrations of the rotating equipment 102 from the wireless sensor 104 by way of the communication network 110. Further, the server 106 transmits the detected faults and the RUL of the rotating equipment 102 to the user device 108 by way of the communication network 110. As shown in FIG. 1, the server 106 includes a receiver 112, a memory 114, a first processor 116, and a transmitter 118 that communicate by way of a first communication bus 120. Examples of the server 106 include, but are not limited to, a cloud server, a personal computer, a laptop, or a network of computer systems. A person of skill in the art will appreciate that server devices may include other components not shown in server 106, and/or different configurations of the components (e.g., a single transceiver can function as both the receiver 112 and the transmitter 118).

The user device 108 may be a smartphone, a personal digital assistant (PDA), a tablet, a laptop, or any other portable communication device. In some embodiments, the user device 108 can be a computer system placed in an operating room of an industry, which receives data of the detected faults and the RUL of the rotating equipment 102.

The receiver 112 can include suitable logic, circuitry, and/or interfaces to receive the digital signals corresponding to the vibrations of the rotating equipment 102 from the wireless sensor 104. In some embodiments, the receiver 112 may receive digital signals from a plurality of wireless sensors. Examples of the receiver 112 include, but are not limited to, an antenna, a radio frequency receiver, a wireless receiver, a Bluetooth receiver, and the like. The receiver 112 communicates with the memory 114, the first processor 116, and the transmitter 118 using various wired and wireless communication protocols, such as TCP/IP (Transmission Control Protocol/Internet Protocol), UDP (User Datagram Protocol), $2^{nd}$ Generation (2G), $3^{rd}$ Generation (3G), $4^{th}$ Generation (4G) communication protocols, and/or any combination thereof.

The memory 114 can include suitable logic, circuitry, and/or interfaces to store instructions that are executed by the first processor 116. Further, the memory 114 stores the digital signals corresponding to the vibrations of the rotating equipment 102 received from the wireless sensor 104. Examples of the memory 114 include, but are not limited to, a random access memory (RAM), a read-only memory (ROM), a programmable ROM (PROM), an erasable PROM (EPROM), and the like.

The first processor 116 can include suitable logic, circuitry, and/or interfaces to execute instructions stored in the memory 114. The first processor 116 stores the digital signals corresponding to the vibrations of the rotating equipment 102 received from the wireless sensor 104 by way of the receiver 112 in the memory 114. The first processor 116 can be configured to de-noise the digital signals corresponding to the vibrations of the rotating equipment 102, e.g., to reduce background noise that may degrade the signal-to-noise ratio of the received digital signals.

The first processor 116 can be configured to use a suitable signal processing algorithm to de-noise a digital signal received from the wireless sensor 104. In some embodiments, the signal processing algorithm can be an Ensemble Empirical Mode decomposition (EEMD) algorithm. An example of an EEMD algorithm is discussed in detail below in FIG. 3.

The first processor 116 can be configured to use machine learning techniques to determine faults and/or predict the RUL. For example, the first processor 116 can be configured to use a Wavelet Neural Network (WNN) to determine the faults in the rotating equipment 102 and/or to predict the remaining useful life of the rotating equipment 102. Examples of a WNN are discussed in detail below in conjunction with FIG. 3 and FIG. 5. The first processor 116 can be configured to transmit the faults detected and/or the RUL of the rotating equipment 102 by way of the transmitter 118. Examples of the first processor 116 include, but are not limited to, an application-specific integrated circuit (ASIC) processor, a reduced instruction set computing (RISC) processor, a complex instruction set computing (CISC) processor, a field-programmable gate array (FPGA), and the like. It will be apparent to a person skilled in the art that the first processor 116 is compatible with multiple operating systems.

The transmitter 118 can include suitable logic, circuitry, and/or interfaces to transmit the detected faults in the rotating equipment 102 to the user device 108. Further, the transmitter 118 transmits the data of detected faults and RUL of the rotating equipment 102 to the user device 108. Examples of the transmitter 118 include, but are not limited to, an antenna, a radio frequency transmitter, a wireless transmitter, a Bluetooth transmitter, and the like. The transmitter 118 communicates with the receiver 112, the memory 114, and first processor 116 using various wired and wireless communication protocols, such as TCP/IP (Transmission Control Protocol/Internet Protocol), UDP (User Datagram Protocol), $2^{nd}$ Generation (2G), $3^{rd}$ Generation (3G), $4^{th}$ Generation (4G) communication protocols, and/or any combination thereof.

Figure 2:
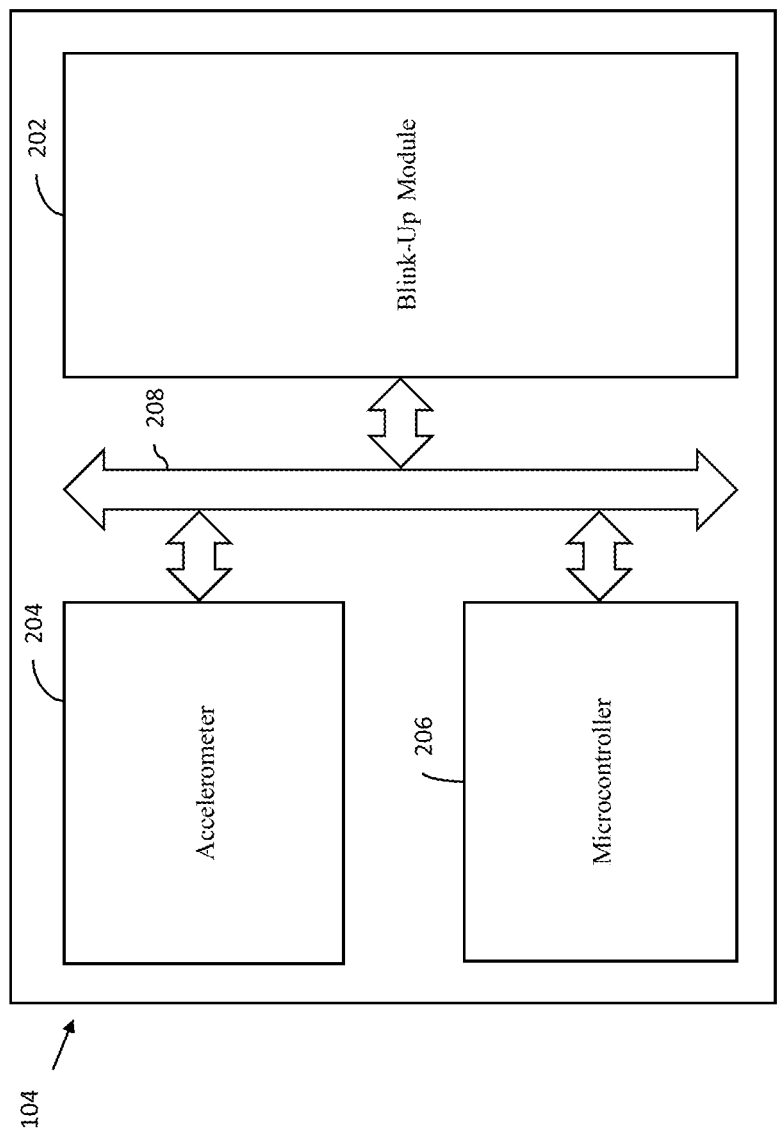
FIG. 2 is a block diagram that illustrates a sensor, in accordance with the techniques described herein.

Referring now to FIG. 2, a block diagram that illustrates the wireless sensor 104 according to the techniques described herein is shown. The wireless sensor 104 is a device, module, and/or subsystem that detects the vibrations of the rotating equipment 102 and transmits vibration data to the server 106 wirelessly by way of the communication network 110. In some embodiments, the wireless sensor 104 is a vibration sensor or an accelerometer that measures the vibrations of the rotating equipment 102 and transmits the vibration data wirelessly to the server 106. For example, the wireless sensor 104 can be a MEMS (Micro-Electro-Mechanical-System) based sensor.

The wireless sensor 104 can be designed to include a (e.g., standardized) slot for plugging in a blink-up module 202. The wireless sensor 104 further includes an accelerometer 204 and a microcontroller 206. The standardized slot can be configured to receive the blink-up module 202 and/or another communication card. In some examples, the blink-up module 202 is an 'Imp' communication module, available from Electric Imp Inc., a California based corporation. The blink-up module 202, the accelerometer 204, and the microcontroller 206 communicate with each other by way of a second communication bus 208. The wireless sensor 104 can establish a connection with the communication network 110 by way of the blink-up module 202. The blink-up module 202 can include a second processor (not shown) and/or a photo-detector (not shown). Further, the blink-up module 202 can include a communication interface (not shown) by way of which the blink-up module 202 establishes a connection with the communication network 110. In some embodiments, the communication interface includes, but is not limited to, a wireless interface, such as a Wi-Fi interface or a Bluetooth interface, and a wired interface, such as an Ethernet interface, an infrared IrDA, an optical fiber interface and the like.

The accelerometer 204 can be a device that senses the vibrations of the rotating equipment 102. The accelerometer 204 transmits vibration signals of the rotating equipment 102 to the microcontroller 206 by way of the second communication bus 208. The accelerometer 204 can be a three-axis accelerometer that measures the vibrations of the rotating equipment 102 in x, y, and z directions. The microcontroller 206 can convert the received vibration signals to digital signals. Further, the digital signals can be transmitted to the server 106 by way of the communication network 110 using the blink-up module 202. Examples of the microcontroller 206 include, but are not limited to, a 8051 microcontroller, a Peripheral Interface controller (PIC), an Atmel AVR microcontroller, an Advanced Risc Machines (ARM) processor, a reduced instruction set computing (RISC) processor, a complex instruction set computing (CISC) processor, and the like. It will be apparent to a person skilled in the art that the microcontroller 206 is compatible with multiple operating systems.

To enable the wireless sensor 104 to communicate with the communication network 110, the blink-up module 202 may need to be set-up. In some embodiments, a software application provided by the Electric Imp that runs on an external computing device (not shown) is designed to automatically extract network setup details of the communication network 110 if the external computing device is connected to the communication network 110. The external computing device can be a smart phone, a laptop, tablet, and the like. The network setup details may include Wi-Fi credentials, such as Wi-Fi SSID, a Wi-Fi Password, and the like.

In some embodiments, the user holds the external computing device's screen up to the photo-detector of the blink-up module 202. Network configuration data for the blink-up module 202 is then sent optically thereto. The external computing device can flash light at a frequency using the screen of the computing device to transmit the setup details to the blink-up module 202. Further, the blink-up module 202 can verify the network configuration data and then relays message regarding establishment of the connection with the communication network 110 to the external computing device. As a result, the wireless sensor 104 can establish connection with the communication network 110, such as Wi-Fi network, to transmit vibration data to the server 106.

The blink-up module 202 can control the wireless sensor 104 and establish the connection of the wireless sensor 104 with the communication network 110. In some examples, circuitry of the wireless sensor 104 may be directly controlled by code executing within a virtual machine (not shown) that runs in the second processor (not shown) of the blink-up module 202. As a result, the second processor of the blink-up module 202 can control the wireless sensor 104. Using the virtual machine inside the blink-up module 202 can allow the wireless sensor 104 to not need a control processor (not shown). The blink-up module 202 can be associated with a unique identifier. The unique identifier can allow the server 106 to identify the wireless sensor 104 from which the vibration data is received. Once the blink-up module 202 establishes the connection with the communication network 110, the server 106 can then use the unique identifier as an index for the vibration data collected from the wireless sensor 104. The server 106 may retrieve an appropriate code required to operate the wireless sensor 104. Thus, the blink-up module 202 acts as a network interface for the wireless sensor 104.

In some embodiments, the vibration data collected by the wireless sensor 104 may be stored on a cloud platform, such as a cloud platform provided by Electric Imp and/or other cloud platforms. In some embodiments, the cloud platform may run on the server 106. For example, an Electric Imp Integrated Development Environment (IDE) (hereinafter, referred to as Imp IDE) provides a platform to deploy signal processing and machine learning codes to process the digital signals received by way of the communication network 110. The Imp IDE can run in a web browser of a computing device. The Imp IDE can be used to deploy codes on both sensor-side and server-side of the system environment 100. In some embodiments, the signal processing and machine learning codes can be run on the server-side to perform the de-noising and detect faults and predict the RUL of the rotating equipment 102. In some embodiments, the signal processing code can be run on the sensor-side to perform the de-noising of the digitals.

Figure 3:
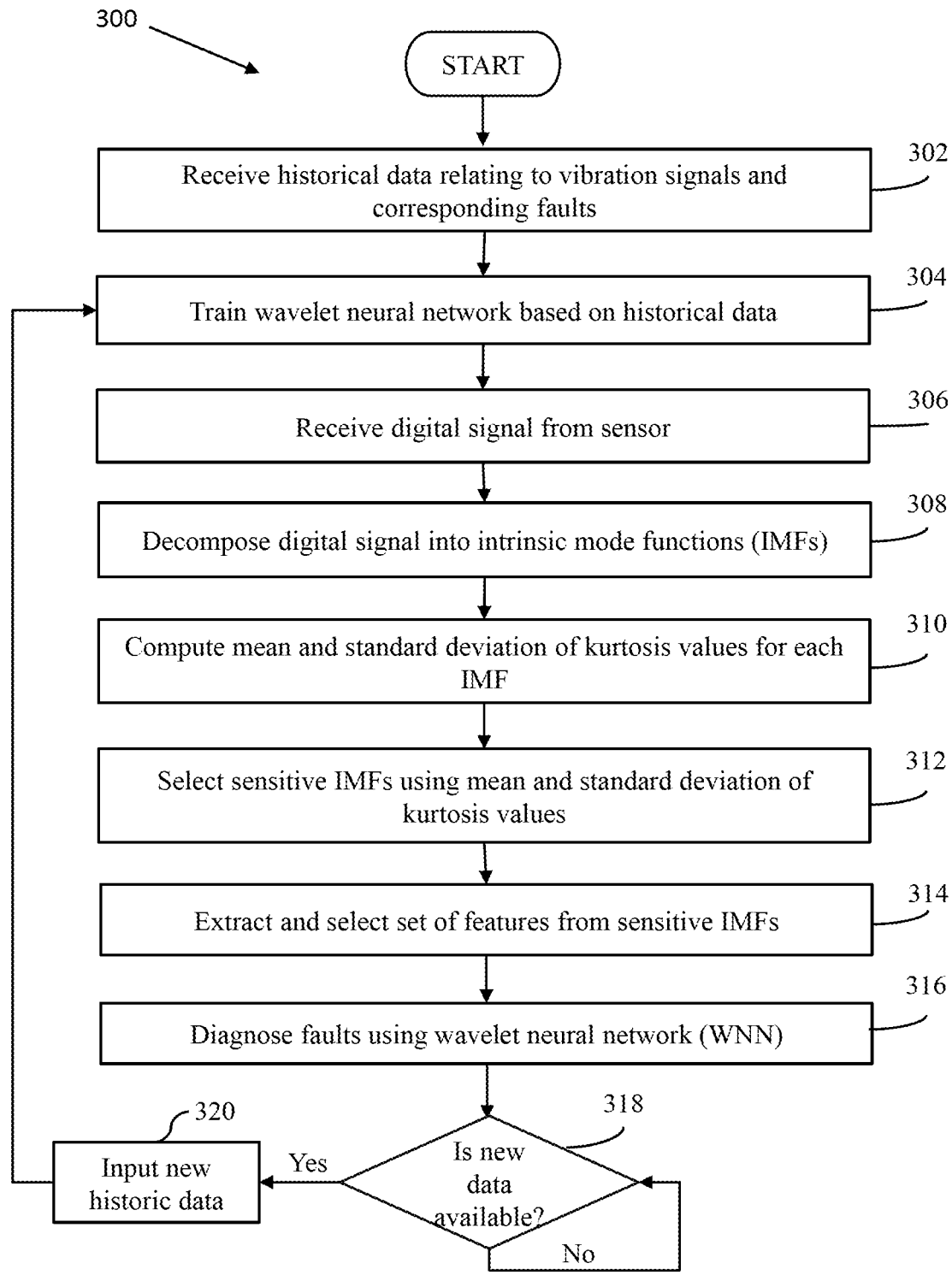
FIG. 3 is a flowchart that illustrates a method for diagnosing faults in the rotating equipment, in accordance with the techniques described herein.

Referring now to FIG. 3, a flow chart that illustrates a method 300 for diagnosing faults in the rotating equipment 102, according to the techniques described herein is shown.

At step 302, the server 106 receives historical data from a database server (not shown) by way of the communication network 110. The historical data can be data indicative of vibration signals and faults collected from a plurality of rotating equipment that function similar to the rotating equipment 102. The database server is a data storage server that includes a memory to store the historical data. In some examples, the historical data of the plurality of rotating equipment corresponds to data of one or more of the following health conditions: (a) normal condition, (b) slight rub fault in the outer race, (c) serious flaking fault in the outer race, and/or the like. Examples of the database server include, but are not limited to, a personal computer, a cloud server, a laptop, or a network of computer systems. In some embodiments, the database server can be the server 106.

In some embodiments, the server 106 is configured to run a wavelet neural network (WNN) based machine learning algorithm. The WNN can be used to diagnose faults in the rotating equipment 102. At step 304, on receiving the historical data, the server 106 may use the historical data to train the WNN. In some embodiments, the WNN may include three layers including an input layer, a hidden layer, and an output layer. Each layer can have one or more neurons or nodes. A wavelet basis function possesses properties of localization and is an orthogonal basis function. The input layer can be fed with features extracted from the historical data. In the hidden layer, the wavelet basis $\psi_{a,b}$ ( ) function can be used as an activation function. The output of the wavelet neural network is provided by the following expression:

$$C = \varphi \frac{(u_k - b)}{a} \tag{1}$$

where,
a is a dilation parameter;
b is a translation parameter; and
$u_k$ is a sum of weighted inputs.

$$u_k = \Sigma W_{ki} x_i \qquad (2)$$

where,
$W_{ki}$ is a weight; and
$x_i$ is an input.

In some embodiments, Morlet wavelet can be used as the activation function of the neurons in the hidden layer. The Morlet wavelet expression and the calculation of partial derivatives of the corresponding error function are computationally efficient. Hence, the Morlet wavelet helps in updating of parameters in the training process. In some embodiments, the wavelet basis function may be one of Haar, Mexican Hat, Shannon, and/or Meyer.

In some embodiments, the Morlet wavelet is represented by the following equation, $$\varphi(t) = \cos(5t) e^{\left(\frac{-t^2}{2}\right)} \qquad (3)$$

where,
t is time.

In some embodiments, the WNN can be trained using back-propagation (BP) algorithm. The back-propagation algorithm can be used to minimize an error function between outputs from the WNN and desired outputs. Here, a desired output is the health condition of a digital signal acquired from the historical data. The server 106 continues the training of WNN till the error function reaches a specified value or the iterations reach a maximum limit. On meeting a criterion, the training of the WNN can be stopped. The output of the wavelet neural network can be in the form of a normalized score ($L_i$). In the output layer, a function is used that maps the normalized score to a specific label. The specific label corresponds to a health condition of the rotating equipment 102. For example, label '1' corresponds to normal condition, label '2' corresponds to slight rub fault in the outer race, label '3' corresponds to serious flaking fault in the outer race, and the like. The training of the WNN can involve optimizing weights, a dilation parameter, or a translation parameter.

At step 306, the server 106 can receive a digital signal corresponding to (e.g., comprising data indicative of) the vibrations of the rotating equipment 102 by way of the communication network 110. As discussed above, the wireless sensor 104 can detect the vibrations of the rotating equipment 102, convert a vibration signal into the digital signal, and transmit the digital signal corresponding to the vibrations of the rotating equipment 102 to the server 106. In some examples, as also discussed above, the wireless sensor 104 includes the blink-up module 202 by way of which the wireless sensor 104 establishes a connection with the communication network 110 to transmit the digital signal to the server 106.

At step 308, the server 106 can pre-process the digital signal using the Ensemble Empirical Mode Decomposition (EEMD) algorithm to de-noise the digital signal. The EEMD algorithm decomposes the digital signal into the plurality of intrinsic mode functions (IMFs). The digital signal having multiple oscillation modes must be decomposed into its constituent mono-component signals i.e., oscillatory modes. Each intrinsic mode function (IMF) is associated with an oscillatory mode embedded in the digital signal. An IMF is a function that satisfies the following two conditions: (a) in the whole data set in the digital signal, the number of extrema and the number of zero crossings must either be equal or differ at most by one, and (b) at any point, the mean value of the envelope defined by the local maxima and the envelope defined by the local minima is zero. If any monocomponent signal i.e., oscillatory mode satisfy the above condition then it becomes the IMF. The digital signal corresponding to the vibrations sensed by the wireless sensor 104 may be weak in nature since it can be affected by the background noise, especially in case of early faults. Therefore, the server 106 can pre-process digital signals to reduce the background noise and the errors of measurement systems, to further acquire useful information and improve signal-to-noise ratio (SNR).

The EEMD algorithm decomposes non-stationary and non-linear signals, and overcomes the mode mixing problem of EMD. To overcome the problem of mode mixing in EMD, EEMD provides the IMF components as a mean of an ensemble (e.g., a set or collection) of trials, as discussed further below. A trial consists of the decomposition results of the digital signal and a white noise of finite amplitude. The addition of the white noise populates whole time-frequency space uniformly with components of different scales. As each of the noise-added decompositions consists of the digital signal and the added white noise, each individual trial may produce noisy results. However, the noise in each trial is different. As a result, EEMD can decrease the mode mixing problem, or even completely eliminate it using the ensemble mean of plurality of trails.

The server 106 can decompose the digital signal using EEMD method as follows: The server 106 can initialize the number of ensembles M, the amplitude of the added white noise, and sets m=1, where m is used to keep track of a particular trial.

The server 106 then can add white noise with a given amplitude to the digital signal x(t), that is, $$x_m(t) = x(t) + n_m(t) \qquad (4)$$

where,
$n_m(t)$ indicates the $m^{th}$ added white noise series;
and $x_m(t)$ denotes the noise-added digital signal of the $m^{th}$ trial.

After adding the white noise, the server 106 can decompose the noise-added digital signal $x_m(t)$ into I IMFs $C_{i, m}$ (i=1, 2, I) utilizing the EMD method, where $C_{i, m}$ represents the $i^{th}$ IMF of the $m^{th}$ trial, and I is the number of IMFs. The EMD method is a known signal processing technique for a person skilled in the art.

Once the digital signals are decomposed into I IMFs, the server 106 checks whether m<M. If m<M, the server 106 repeats the decomposition of the digital signal with m=m+1 where each time different white noise is added to the digital signal.

Further, the server 106 can compute the ensemble mean $a_i$ of the M trials for each IMF.

$$ai = \frac{1}{M} \sum_{m=1}^{M} Ci, m \qquad (5)$$

where,
i=1 to L; and
m=1 to M.

The server 106 can use the mean $a_i$ (i=1 to I) of each of the I IMFs as the final IMFs.

At step 310, after obtaining the decomposed IMFs, the server 106 can calculate kurtosis values, the mean, and the standard deviation of the kurtosis value of each IMF. All the IMFs are not sensitive and are related to the faults. Therefore, to avoid interference of fault-unrelated components, the server 106 can select a sensitive IMF. For instance, when a local defect, such as rub and flaking in an outer race, occurs in the rotating equipment 102, the digital signals show a series of impulses. Kurtosis is able to detect impulse components caused by local defects. Therefore, kurtosis values are used to select the sensitive IMF from the I IMFs decomposed by the EEMD algorithm.

For each health condition of data set, the server 106 can compute the kurtosis values of I IMFs for each data sample. The kurtosis of the $i^{th}$ IMF of the sth data sample is given by the equation:

$$k_{i,s} = \frac{N \sum_{n=1}^{N} (a_{n,i} - a'_i)^4}{\left( \sum_{n=1}^{N} (a_{n,i} - a'_i)^2 \right)^2} \quad (6)$$

where,
$a_{n,i}$ is the $n^{th}$ data point in the ith IMF $a_i$;
$a'_i$ is the average of $a_i$;
N is the number of data points of $a_i$;
I is the number of IMFs; and
S is the number of the data samples.

Further, the server 106 can compute the mean and the standard deviation of the kurtosis values of each IMF as follows:

$$m_i = \frac{1}{S} \sum_{s=1}^{S} k_{i,s} \quad (7)$$

where,
$m_i$ is the mean of the kurtosis values.

$$std_i = \sqrt{\frac{1}{S-1} \sum_{s=1}^{S} (k_{i,s} - m_i)^2} \quad (8)$$

where,
$std_i$ is the standard deviation of the kurtosis values.

At step 312, the server 106 can select the sensitive IMF from the I IMFs that are related to the faults. The server 106 can construct a criterion for the selection of the sensitive IMF. For signals of normal health condition, the kurtosis values of IMFs are small. When the rotating equipment 102 has local defects, the kurtosis values of IMFs increase. Therefore, fault-free digital signals have smaller mean $m_i$ value than that of faulty digital signals. Furthermore, based on whether the health condition is normal or faulty, a small standard deviation $std_i$ value may be used to distinguish various health conditions of the rotating equipment 102.

The selection criterion for selecting the sensitive IMFs is:

$$f_i = \begin{cases} m_i std_i & \text{for fault-free rotating equipment} \\ \frac{std_i}{m_i} & \text{for faulty free rotating equipment} \end{cases} \quad i = 1, 2, 3, \ldots, I. \quad (9)$$

The server 106 can select the sensitive IMF of the data sample under each health condition. Based on the definition of the selection criterion, the smallest $f_i$ in equation (9) indicates the sensitive IMF.

At step 314, the server 106 can extract statistical features from the sensitive IMF. When a fault occurs, the strength of the rotating equipment 102 around the fault changes, producing an impulse or shock. Further, the impulse may result in the variation of the collected digital signal. Moreover, amplitudes and distributions of the time-domain signals are changed. Therefore, time-domain statistical features can be extracted from time-domain waveforms of the digital signal to reflect the mechanical faults. Mean value (Xm) reflects the average of a signal. Root amplitude (Xroot), root mean square (Xrms), and peak (Xpeak) reflect the vibration amplitude and energy of the time-domain digital signal. Generally, a fault can excite a mechanical vibration and thereby raise the values of the mean value, the root amplitude, the root mean square, and the peak. When the fault becomes severe, the mean value, the root amplitude, the root mean square, and the peak values may reflect the severe degree of the fault; but they are not sensitive to weak incipient faults. The kurtosis value, the crest factor, the impulse factor, and the clearance factor can measure the impulse excitation in digital signals. The kurtosis value and the crest factor are robust to varying operating conditions and can be used as statistical features for incipient faults.

In some embodiments, the kurtosis value is sensitive to early faults. With the increase in severity of the faults, the kurtosis value also increases gradually. However, the kurtosis value may unexpectedly decrease for more severe faults. Therefore, the time-domain statistical features may not, alone, reflect the changes of faults at various degrees of severity. Therefore, more features can be extracted to effectively diagnose the faults in rotating equipment 102.

In some embodiments, the server 106 further processes the digital signal in frequency-domain to compensate for the shortcoming of the time-domain, since the time-domain representation reflects the variation from the waveform of the digital signal and cannot disclose the inherent nature of the digital signal. When a fault occurs in the rotating equipment 102, some abnormal frequencies typically emerge in the frequency spectra of the digital signal, which can reflect the health conditions of the rotating equipment 102. Moreover, frequency spectra are often more sensitive to incipient faults since an imperceptible change will produce a spectrum line in corresponding frequency spectrum. Therefore, it may be useful for fault diagnosis to extract frequency-domain statistical features. In addition, these frequency-domain statistical features may contain some fault-related information that may not be present in the time domain statistical features. In other words, these statistical features in the frequency domain can be an effective compensation for those time-domain statistical features alone.

For example, a mean frequency indicates the vibration energy in the frequency domain, which represents the average of the amplitudes of all the frequencies. With the increase of fault severity, the mean frequency becomes larger. A standard deviation frequency describes the convergence of the spectrum power, reflecting the energy of frequency spectrum. A root mean square frequency shows the position change of main frequencies which are dominant in the frequency spectrum. Therefore, the frequency-domain features reflect the mechanical health conditions from different aspects. Different faults will result in the variation of the whole frequency spectrum and power spectrum. According to different fault categories, suitable statistical features are selected by the server 106 to achieve accurate diagnosis results.

In some embodiments, for diagnosis purposes, the server 106 may extract time and frequency domain statistical features from the sensitive IMFs to identify various mechanical health conditions. The statistical features can be standard deviation (Xstd), kurtosis (Xkur), shape factor (SF), impulse factor (IF) in the time domain, mean frequency (Xmf), root mean square frequency (Xrmsf), standard deviation frequency (Xstdf), spectrum peak ratio of bearing outer race (SPRO), spectrum peak ratio of bearing inner race (SPRI), spectrum peak ratio of bearing roller (SPRR) in the frequency domain, and/or the like. The server 106 can use SPRO, SPRI, and/or SPRR to extract features from the envelope spectrum of the sensitive IMFs. Therefore, in some embodiments, four time-domain statistical features (e.g., Xstd, Xkur, SF, IF), three frequency-domain statistical features (e.g., Xmf, Xrmsf, Xstdf), and three time-frequency domain statistical features (e.g., SPRO, SPRI, SPRR) are extracted from the sensitive IMFs of each data sample.

The time-domain statistical features can include:

$$Xstd = \sqrt{\frac{\sum_{n=1}^{N}(x(n)-Xm)^2}{N-1}} \qquad (10)$$

where,
Xstd is standard deviation;
Xm is mean value which denotes an average of the signal X(n)
where, $$Xm = \frac{\sum_{n=1}^{N}x(n)}{N};$$

x(n) is the digital signal series for n=1 to N; and
N is the number of data points.

$$Xkur = \frac{\sum_{n=1}^{N}(x(n)-Xm)^2}{N-1} \qquad (11)$$

where,
Xkur is the kurtosis;
Xm is mean value which denotes an average of the signal X(n)
where, $$Xm = \frac{\sum_{n=1}^{N}x(n)}{N};$$

Xstd is standard deviation;
x(n) is the digital signal series for n=1 to N; and
N is the number of data points.

$$SF = \frac{\sqrt{\frac{\sum_{n=1}^{N}(x(n)-Xm)^2}{N-1}}}{(N-1)Xstd^4} \qquad (12)$$

where,
SF is the Shape Factor;
Xstd is standard deviation;
Xm is mean value which denotes an average of the signal X(n)
where, $$Xm = \frac{\sum_{n=1}^{N}x(n)}{N}.$$

x(n) is the digital signal series for n=1 to N; and
N is the number of data points.

$$IF = \frac{\max|x(n)|}{(N-1)Xstd^4} \qquad (13)$$

where,
IF is the Impulse Factor;
Xstd is standard deviation;
x(n) is the digital signal series for n=1 to N; and
N is the number of data points.

The frequency-domain statistical features are $$Xmf = \frac{\sum_{k=1}^{K}s(k)}{K} \qquad (14)$$

where,
Xmf is the mean frequency;
s(k) is a spectrum for k=1, 2, ..., K; and
K is the number of spectrum lines.

$$Xrmsf = \sqrt{\frac{\sum_{k=1}^{K}f_k^2 s(k)}{\sum_{k=1}^{K}s(k)}} \qquad (15)$$

where,
Xrmsf is the root mean square frequency;
s(k) is a spectrum for k=1, 2, ..., K;
K is the number of spectrum lines; and
fk is the frequency value of the kth spectrum line.

$$Xstdf = \sqrt{\frac{\sum_{k=1}^{K}(s(k)-Xmf)^2}{K-1}} \qquad (16)$$

where,
Xstdf is the standard deviation frequency;
Xmf is the mean frequency;

s(k) is a spectrum for k=1, 2, ..., K; and
K is the number of spectrum lines.

The time-frequency domain statistical features are $$SPRO = \frac{K \sum_{i=1}^{H} p_O(h)}{\sum_{k=1}^{K} s(k)} \tag{17}$$

where,
s(k) is a spectrum for k=1, 2, ..., K;
K is the number of spectrum lines;
$p_O(h)$ is the peak values of the hth harmonics of the characteristic frequencies for bearing outer race ($f_O$) which is calculated as $$f_O = \frac{fr}{2} Nr \left(1 - \frac{B}{C} \cos\alpha\right) \tag{18}$$

where,
h=1, 2, ..., H;
H is the number of harmonics;
fr is the shaft rotational frequency;
NR is the roller number; a is the contact angle; and
B and C are the roller and pitch diameters, respectively.

$$SPRI = \frac{K \sum_{i=1}^{H} p_I(h)}{\sum_{k=1}^{K} s(k)} \tag{19}$$

where,
s(k) is a spectrum for k=1, 2, ..., K;
K is the number of spectrum lines;
$p_I(h)$ is the peak values of the hth harmonics of the characteristic frequencies for bearing inner race ($f_I$) which is calculated as $$fI = \frac{fr}{2} Nr \left(1 + \frac{B}{C} \cos\alpha\right) \tag{20}$$

where,
fr is the shaft rotational frequency;
NR is the roller number; a is the contact angle; and
B and C are the roller and pitch diameters, respectively.

$$SPRR = \frac{K \sum_{i=1}^{H} p_R(h)}{\sum_{k=1}^{K} s(k)} \tag{21}$$

where,
s(k) is a spectrum for k=1, 2, ..., K;
K is the number of spectrum lines;
$p_R(h)$ is the peak values of the $h^{th}$ harmonics of the characteristic frequencies for bearing roller ($f_R$) which is calculated as $$fR = \frac{frC}{2B} \left(1 - \left(\frac{B}{C} \cos\alpha\right)^2\right) \tag{22}$$

where,
fr is the shaft rotational frequency; and
B and C are the roller and pitch diameters, respectively.

At step 316, the server 106 inputs the selected statistical features into the trained WNN to automatically recognize the mechanical health conditions. The input layer may include the statistical features extracted at time t as the input to the WNN. The WNN processes the statistical features in the hidden layer using the Morlet Wavelet Function to produce an output at the output layer. The output of the wavelet neural network can be in form of a normalized score. In the output layer, a function can be used that maps the normalized score to a specific label. The specific label corresponds to a health condition of the rotating equipment 102. For example, label '1' corresponds to normal condition, label '2' corresponds to slight rub fault in the outer race, label '3' corresponds to serious flaking fault in the outer race, and so forth. The output of the WNN represents the faults detected in the rotating equipment 102.

At step 318, the server 106 checks if new historical data is available. If the new historical data is available, the server 106 can extract the new historical data from the database server by way of the communication network 110. After extracting the new historical data, the server 106 performs step 320. If the new historical data is not available, the server 106 can continue to perform step 318 to check for availability of the new historical data until the new historical data is available.

At step 320, on receiving the new historical data, the server 106 provides the new historical data as an input to the WNN. The server 106 incrementally trains the WNN to detect faults in the rotating equipment 102. With the more available historical data, inventors have run experiments demonstrating that the WNN can be trained to achieve accuracy of more than 99% for diagnosis of faults in the rotating equipment 102.

In some embodiments, the number of layers or neurons of the WNN can be increased, e.g., to achieve an optimum structure of the WNN. In some embodiments, the server 106 can automatically select the number of ensembles M that best fits for efficient processing of the digital signal.

Figure 4:
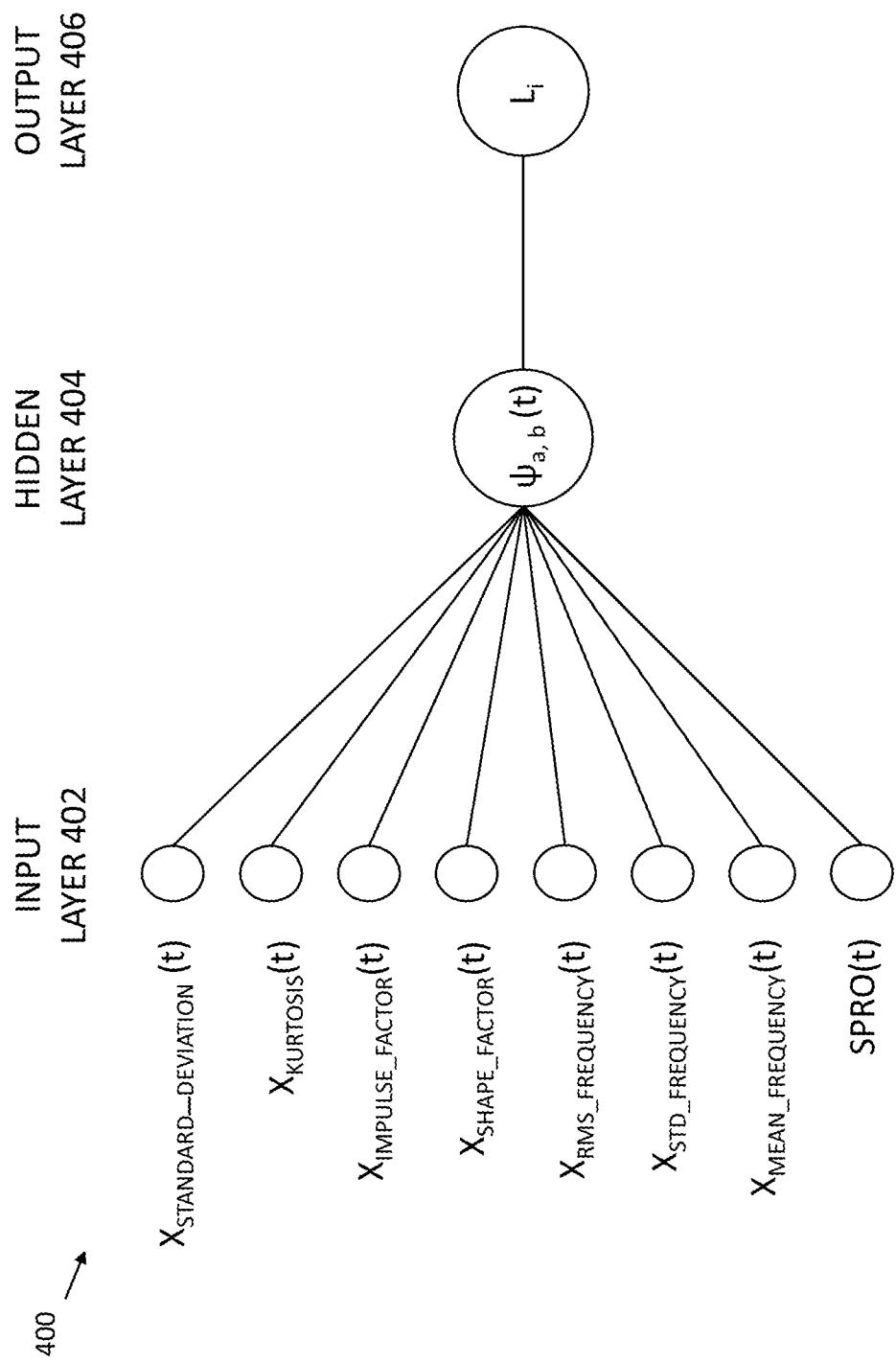
FIG. 4 illustrates a wavelet neural network model for diagnosing faults in the rotating equipment, in accordance with the techniques described herein.

Referring now to FIG. 4, an exemplary wavelet neural network (WNN) model 400 for diagnosing faults in the rotating equipment 102, in accordance with the techniques is described herein.

The WNN 400 may include one or more layers. Each layer has one or more neurons or nodes. The WNN includes three layers including the input layer 402, the hidden layer 404, and the output layer 406 as shown in FIG. 4. The input layer introduces input values into the WNN 400. The number of neurons in the input layer 402 can equal the number of extracted statistical features at the time t. The server 106 can extract one or more statistical features that are provided as inputs to each neuron of the input layer 402. For example, the statistical features may be four time-domain statistical features (e.g., Xstd, Xkur, SF, IF), three frequency-domain statistical features (e.g., Xmf, Xrmsf, Xstdf), and three time-frequency domain statistical features (e.g., SPRO, SPRI, SPRR). The output layer 406 may include a function that delivers output of the WNN 400. The hidden layer 404 and the output layer 406 may include one neuron each. In the hidden and outer layers 404 and 406, the wavelet basis function φ a,b (t) can be used as an activation function for the statistical features at time t. The Morlet wavelet can be used as an activation function of the neurons in the hidden layer 404. In another embodiment, the wavelet basis function may be one of Haar, Mexican Hat, Shannon, and Meyer. The output from the output layer 406 is a normalized score ($L_i$) that corresponds to the faults detected in the rotating equipment 102. In some embodiments, each of the connections between nodes in successive pairs of layers has an associated weight held in a matrix, and the number of layers and nodes may be selected or adjusted according to the application the WNN 400 is intended to perform.

Figure 5:
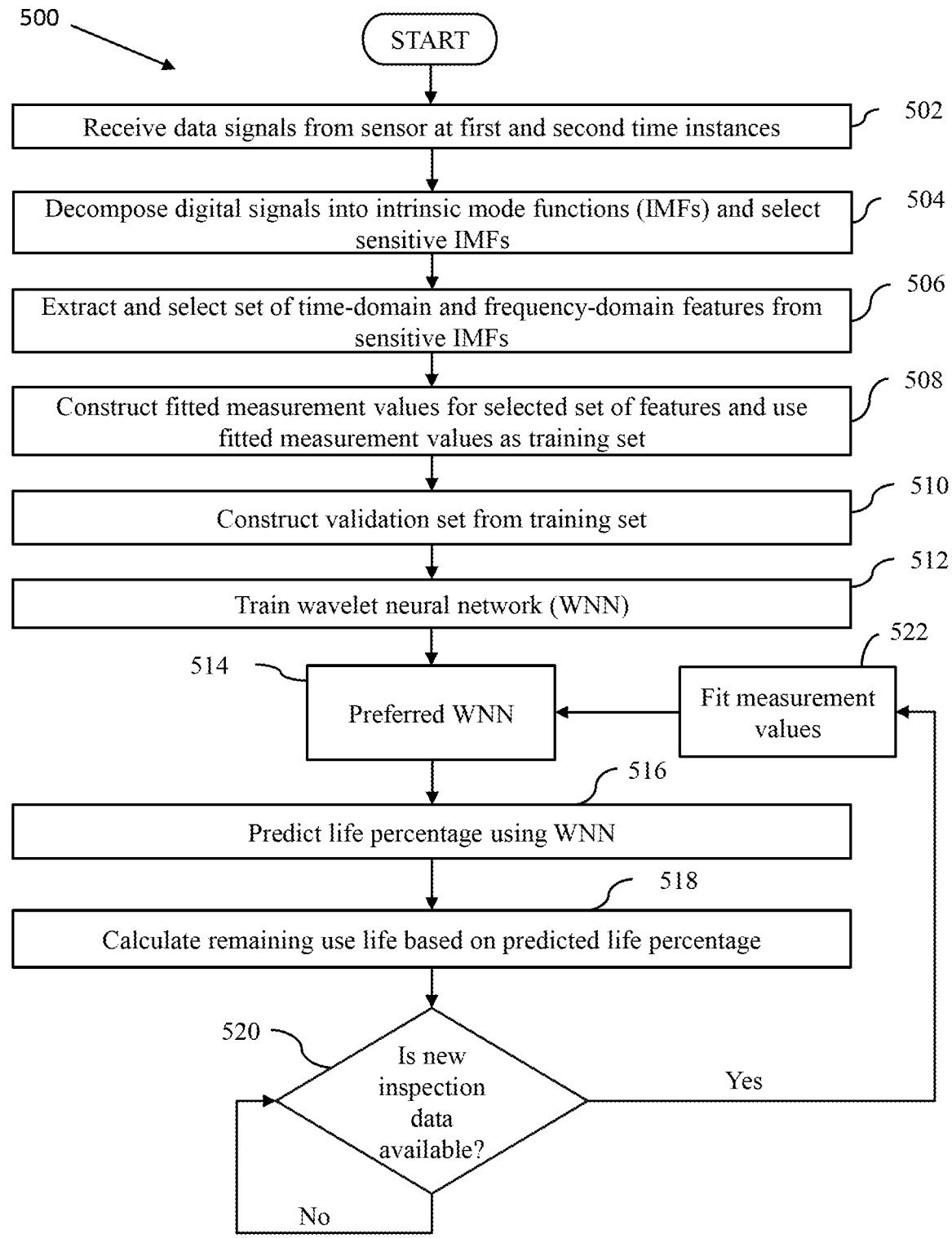
FIG. 5 is a flowchart that illustrates a method for prognosis of the rotating equipment to estimate a remaining useful life thereof, in accordance with the techniques described herein.

Referring now to FIG. 5, a flow chart that illustrates a method 500 for predicting the remaining useful life of the rotating equipment 102, according to the techniques described herein is shown.

At step 502, the server 106 receives digital signals at a first time instance t−1 and a second time instance t from the wireless sensor 104 by way of the communication network 110. The wireless sensor 104 can detect the vibrations of the rotating equipment 102, convert the vibration signals into the digital signals, and transmit the digital signals to the server 106. The digital signals at the first and second time instances t−1 and t can correspond to the vibrations of the rotating equipment 102 at a previous inspection time and a present inspection time, respectively.

At step 504, the server 106 pre-processes the digital signals using the Ensemble Empirical Mode Decomposition (EEMD) algorithm, to de-noise the digital signals. The server 106 can decompose the digital signals into a plurality of intrinsic mode functions (IMFs). The decomposition of the digital signals into the plurality of IMFs is described in detail above in regard to FIG. 3. The server 106 can further select sensitive IMFs from the IMFs. The server 106 can construct a criterion for the selection of sensitive IMFs. The selection criterion of sensitive IMFs is described in detail above in regard to FIG. 3.

The server 106 is configured to run a wavelet neural network (WNN) based machine learning algorithm. The WNN can be used to predict remaining useful life of the rotating equipment 102. In some embodiments, the WNN may include three layers including an input layer, a hidden layer, and an output layer. Each layer has one or more neurons or nodes. A wavelet basis function possesses properties of localization and is an orthogonal basis function. In the hidden and outer layers, the wavelet basis function $\varphi_{a,b}$ ( ) can be used as an activation function. The output of the wavelet neural network is provided by the following expression, $$C = \varphi \frac{(u_k - b)}{a} \quad (23)$$

where,
a is a dilation parameter;
b is a translation parameters; and
$u_k$ is a sum of weighted inputs $$u_k = \Sigma W_{ki} x_i \quad (24)$$

where,
$W_{ki}$ is a weight; and
$x_i$ is an input.

In some embodiments, Morlet wavelet can be used as an activation function of the neurons in the hidden layer. The Morlet wavelet expression and the calculation of partial derivatives of the corresponding error function are computationally efficient. Hence, the Morlet wavelet updates the parameters in the training process. In another embodiment, the wavelet basis function may be one of Haar, Mexican Hat, Shannon, and Meyer.

In some embodiments, the Morlet wavelet is, $$\varphi(t) = \cos(5t) e^{\left(\frac{-t^2}{2}\right)} \quad (25)$$

where,
t is time.

At step 506, the server 106 can extract features from the sensitive IMFs of the digital signals at the first and second time instances t−1 and t. In some embodiments, the server 106 can extract combination of time-domain and frequency-domain features from the sensitive IMFs. For example, the kurtosis (Xkur), the root mean square (Xrms), the peak factor (Xpeak), and the crest (Xcrest) are extracted statistical features from the sensitive IMFs. The combination of time-domain and frequency domain features allows the WNN to predict the remaining useful life of the rotating equipment 102 with improved accuracy.

At step 508, the server 106 fits the extracted statistical features with Weibull hazard rate function. The server 106 can be then configured to input fitted statistical features into the WNN as inputs, thereby increasing the accuracy of the prediction of remaining useful life of the rotating equipment 102. In reliability analysis, the Weibull hazard rate function is the failure rate measure that indicates the health condition of the rotating equipment 102 at a given time. The Weibull hazard rate function is a powerful tool in representing various practical lifetime distributions and flexible enough to represent distributions with different scales and shapes. The values of the fitted statistical features are fitted measurement values. The fitted statistical features prevent any distortion of the values caused due to external noise factors in the digital signals collected in practical applications. The Weibull hazard rate function used to fit the extracted statistical features is, $$h(t) = \frac{f(t)}{1 - F(t)} \quad (26)$$

where,
f(t) is a probability density function; and
F(t) is a cumulative distributive function and is provided by the following expression $$F(t) = 1 - e^{\left(\frac{-t}{\gamma}\right)^\eta}; t > 0 \quad (27)$$

where,
γ is the scale parameter;
η is the shape parameter; and
t is a statistical feature value.

In some embodiments, a training set can be formed for the WNN by considering the digital signals at the first and second time instances t−1 and t. The server 106 uses the fitted measurement values of the extracted statistical features at the first and second time instances t−1 and t as input values to the WNN. The output of the WNN can be normalized life percentage Ti. Life percentage provides accurate mapping of the health condition of the rotating equipment 102, which is proportional to time. The rotating equipment 102 can be considered to be totally damaged when the rotating equipment 102 reaches 100% of the life percentage. The output of the WNN can be normalized between 0 and 1. Further, the output of the WNN is a predicted value of the life percentage of the rotating equipment 102.

The server 106 can plot the graphs of each fitted statistical feature from a time instance t=0 to t=n and renders the graphs on a user interface. In some embodiments, threshold values of extracted statistical features can be taken into consideration for plotting the graphs of each fitted statistical feature. Further, the server 106 can combine curves from the graphs of each fitted statistical feature to form a composite curve (not shown). From the composite curve, life percentage of the rotating equipment 102 can be calculated using the cumulative distributive function (CDF) by the server 106. The life percentage calculated using the CDF can be considered as an actual value of the life percentage of the rotating equipment 102. The actual life percentage value can be calculated at any time instance using the CDF.

In some embodiments, the training set can be formed of historical data includes vibration signals, faults, and equipment life collected from one or more rotary equipment that function similar to the rotating equipment 102. The equipment life represents time (in hours or days) until a rotary equipment fails. The vibration signals are collected at regular intervals of time from the rotary equipment. The server 106 can extract statistical features from the vibration signals collected at first and second time instances t−1 and t. The server 106 can fit the extracted statistical features with Weibull hazard rate function. The server 106 can use fitted measurement values as input values to the WNN. The output of the WNN can be normalized life percentage Ti. The life percentage value from the WNN is predicted life percentage of the rotary equipment. The server 106 can calculate actual life percentage at any time instance based on the equipment life.

Further, the server 106 calculates a mean square error (MSE) between the actual value and predicted value. The MSE can be used to present the network performance to define preferred WNN model. The equation is stated as:

$$MSE = \frac{1}{N}\sum_{i=1}^{N}(\text{error}(i))^2 = \frac{1}{N}\sum_{i=1}^{N}(\text{actual}(i) - \text{predicted}(i))^2 \quad (27)$$

where,
N is the data collected till time instance t=n (current time instance).

After the server 106 obtains the MSE, the server 106 adjusts weights and biases of the WNN to minimize the MSE. The server 106 performs the training process at regular time intervals.

At step 510, the server 106 can construct a validation set by multiplying the fitted statistical features at the first and second time instances t−1 and t with a constant value (Cp). Moreover, the validation set contains the actual value of the life percentage of the rotating equipment 102 multiplied by the constant value (Cp). In some embodiments, the constant value (Cp) is 1.1 where the fitted statistical features are incremented by 10%.

At step 512, the server 106 trains the WNN for predicting the life percentage of the rotating equipment 102. In some embodiments, the server 106 can train the WNN using Levenberg-Marquardt (LM) algorithm based on the training set and the validation set. A person with skill in the art will appreciate that any suitable algorithm can be used to train the WNN. The over-fitting problem can be solved by the use of validation set. During training process of the WNN, the MSE for the training set and the validation set are calculated. Both of the mean square errors drop early in the training process, because the WNN can learn the relationship between the inputs and the outputs by modifying the trainable weights based on the training set. After a certain point, the mean square error for the validation set starts to increase because the WNN starts to model the noise in the training set. Thus, the training process may be stopped at this point, and the preferred WNN with optimum modeling and generalization capability is achieved.

At step 514, the training process of WNN is completed, and the preferred WNN model can be used for the RUL prediction.

At step 516, the server 106 predicts life percentage of the rotating equipment 102 at the current time t using the preferred WNN. At step 518, the server 106 calculates the RUL of the rotating equipment 102 based on the predicted life percentage. The remaining useful life is given by the equation:

$$\text{Remaining useful life (\%)} = (100\%) - (\text{predicted life percentage}) \quad (28)$$

In some embodiments, a manufacturer of rotating equipment 102 provides details related to rotating equipment life in product specification. The rotating equipment life is number of operating hours or number of revolutions at a given speed that the rotating equipment 102 is capable of enduring before any signs of fatigue. The remaining useful life (in hours) of the rotating equipment 102 can be calculated using rotating equipment life and remaining useful life (%).

At step 520, the server 106 can check if new inspection data is available at the current time. If the new inspection data is available, the server 106 can input the new inspection data received from the wireless sensor 104 by way of the communication network 110 to the preferred WNN. After extracting features from the new inspection data, the server 106 can perform step 522.

At step 522, the server 106 can fit the new inspection data on to the Weibull hazard rate function. Fitted measurement values are used as inputs to the WNN for prediction of the RUL of the rotating equipment 102. If the new inspection data is not available, the server 106 can continue to perform step 520 to check for availability of the new inspection data until the new inspection data is available.

Figure 6:
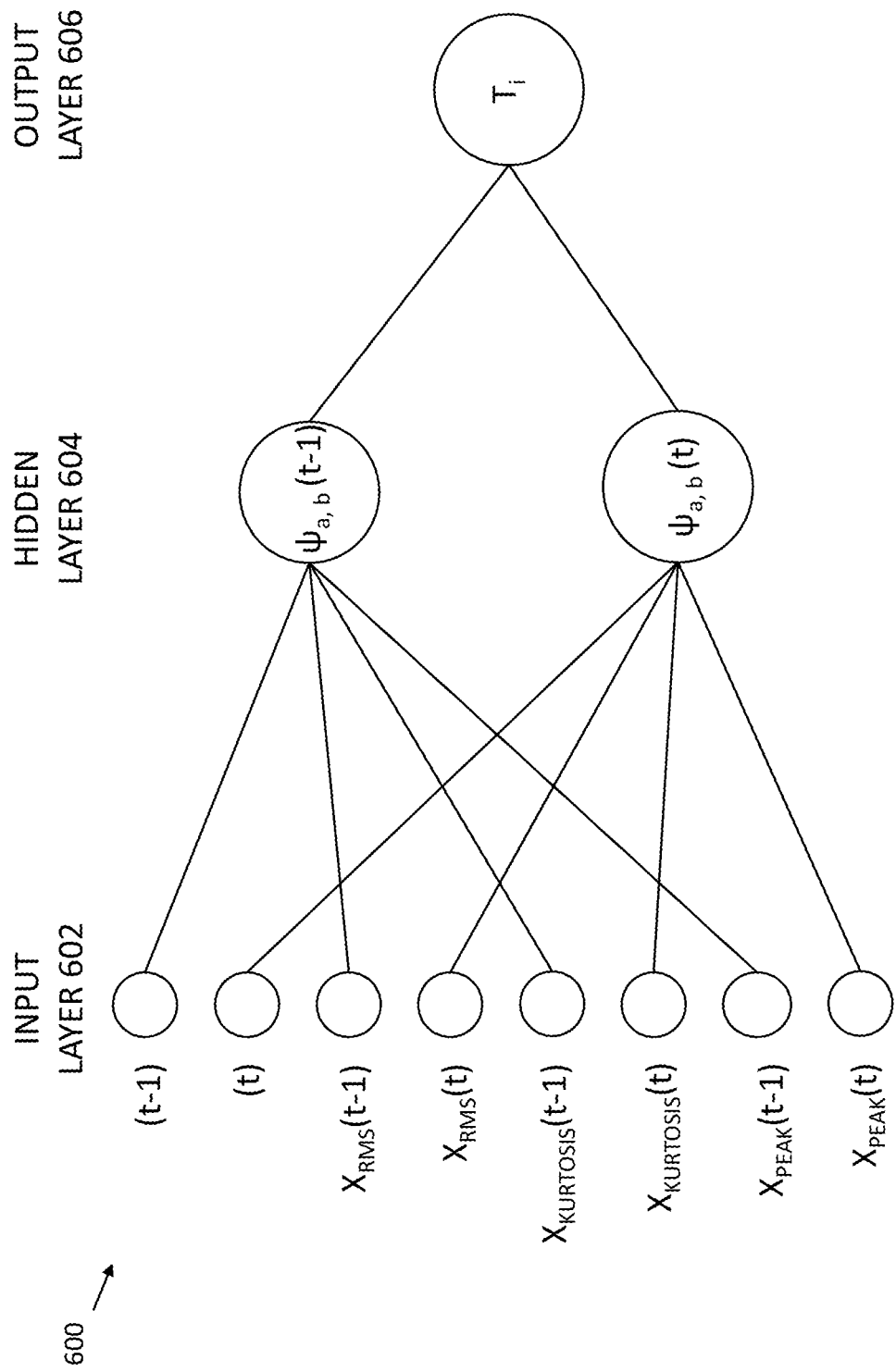
FIG. 6 illustrates a wavelet neural network model for prognosis of the rotating equipment, in accordance with the techniques described herein.

Referring now to FIG. 6, an exemplary wavelet neural network model 600 for prognosis of the rotating equipment, in accordance with the techniques, is described herein.

The WNN 600 can be used to predict remaining useful life of the rotating equipment 102, for example. The WNN 600 may include one or more layers. Each layer has one or more neurons, or nodes. The WNN 600 includes three layers including the input layer 602, the hidden layer 604, and the output layer 606 as shown in FIG. 6. The number of neurons in the input layer 602 equals the number of extracted statistical features at the time instances t and t−1. The server 106 can extract one or more statistical features that are provided as inputs to the input layer 602. The inputs of the WNN 600 may be, as shown in this example, (a) t and t−1, which are the time values at the time instances t and t−1, respectively; (b) $X_{KURTOSIS}(t)$ and $X_{KURTOSIS}(t-1)$, which are kurtosis values of fitted measurements at the time instances t and t−1, respectively; $X_{RMS}(t)$ and $X_{RMS}(t-1)$, which are root mean square (RMS) values of fitted measurements at the time instances t and t−1, respectively; and $X_{PEAK}$ (t) and $X_{PEAK}$ (t−1), which are peak values of fitted measurements at the time instances t and t−1, respectively. The hidden layer 604 and the output layer 606 may include one or more neurons, each. In the hidden and outer layers 604 and 606, wavelet basis function φ a,b (t) can be used as an activation function for the statistical features at time t. On the other hand, wavelet basis function φ a,b (t−1) can be used as an activation function for the statistical features at time t−1. The Morlet wavelet can be used as an activation function of the neurons in the hidden layer 604. In another embodiment, the wavelet basis function may be one of Haar, Mexican Hat, Shannon, and Meyer. The output layer 606 represents the remaining useful life (Ti) of the rotating equipment 102. The output from the output layer 606 can be a normalized life percentage ($T_t$). The normalized life percentage may be used to calculate remaining useful life of the rotating equipment 102. In some embodiments, each connection between nodes in successive pairs of layers has an associated weight held in a matrix, and the number of layers and nodes may be selected or adjusted according to the application the WNN 600 is intended to perform.

Figure 7:
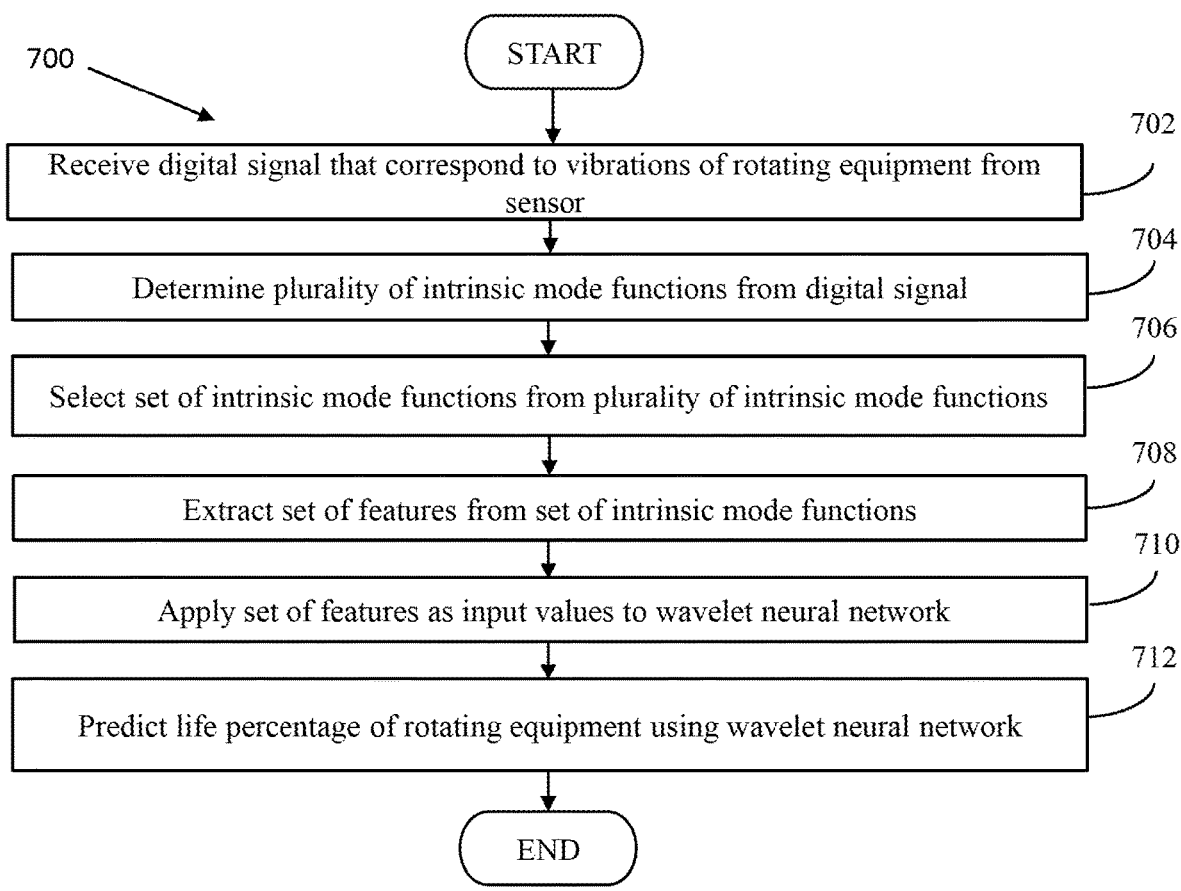
FIG. 7 is a flowchart that illustrates a method for monitoring a rotating equipment, in accordance with the techniques described herein.

Referring now to FIG. 7, a flow chart that illustrates a method 700 for monitoring the rotating equipment 102, according to the techniques described herein is shown.

At step 702, the server 106 receives an input data relating to digital signal that correspond to data indicative of vibrations of the rotating equipment 102. The server 106 can receive the input data in form of the digitals signal from the wireless sensor 104 positioned in proximity of the rotating equipment 102 by way of the communication network 110.

At step 704, the server 106 determines a plurality of intrinsic mode functions from the digital signal. The server 106 can use a signal processing algorithm, such as the Ensemble Empirical Mode Decomposition (EEMD) algorithm to de-noise the received digital signal from the wireless sensor 104.

At step 706, the server 106 selects a set of intrinsic mode functions from the plurality of intrinsic mode functions based on criterion to select the set of intrinsic mode functions. The criterion can be determined based on values of a mean and a standard deviation of kurtosis values computed for each of the plurality of intrinsic mode functions.

At step 708, the server 106 extracts a set of features from the set of selected intrinsic mode functions. The set of features can include a combination of time-domain features and/or frequency-domain features.

At step 710, the server 106 applies the set of features as input values to a wavelet neural network.

At step 712, the server 106 predicts life percentage of the rotating equipment 102 using the wavelet neural network and the applied input values. Further, the server 106 can display RUL of the rotating equipment 102 on a user interface of the user device 108, where the server 106 determines the RUL based on the life percentage.

Figure 8B:
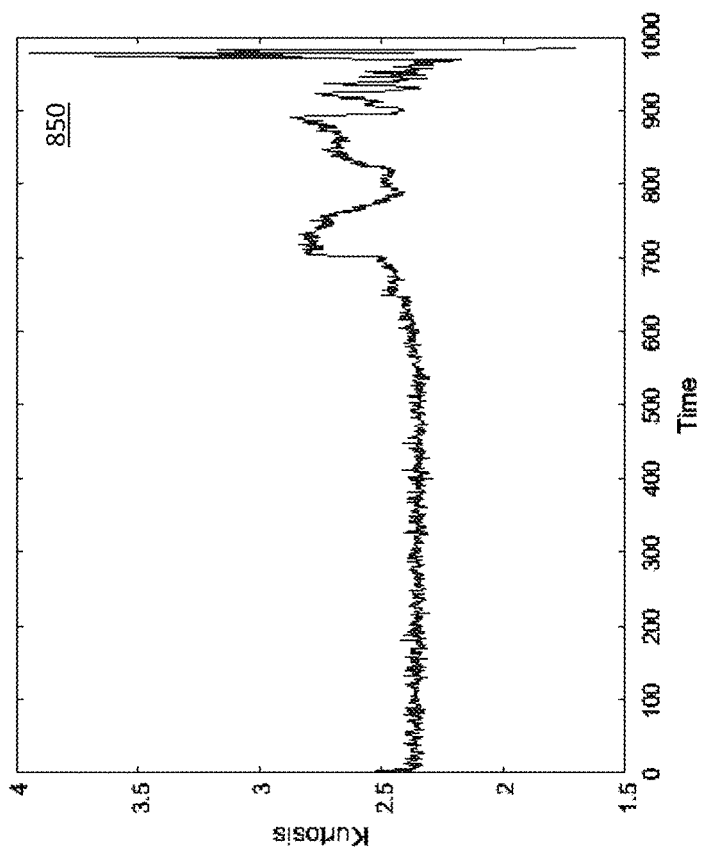
FIG. 8B is a graph of fitted kurtosis measurement of the rotating equipment vs. time, in accordance with the techniques described herein.
Figure 8A:
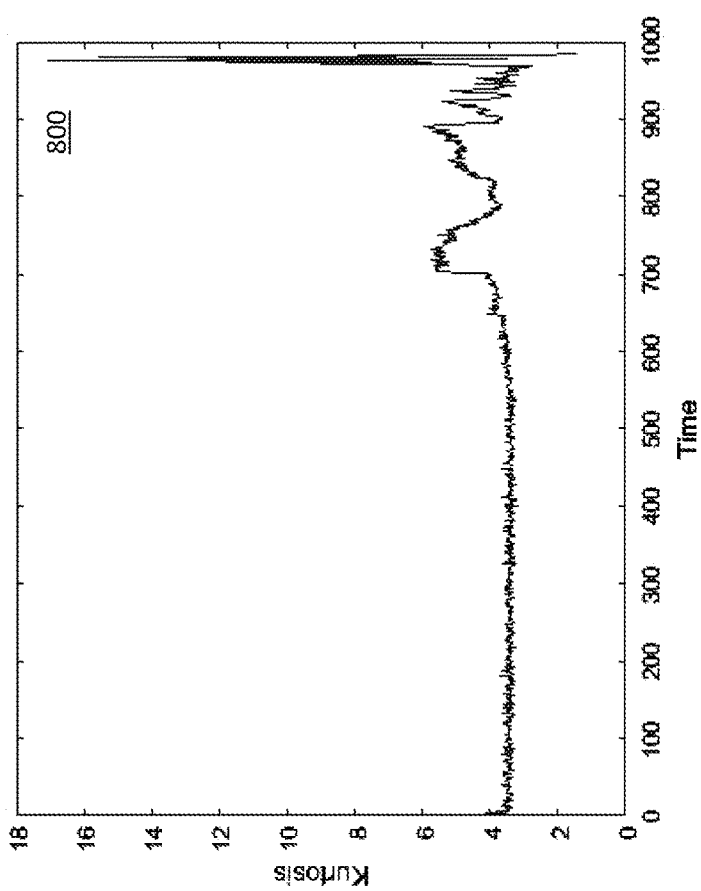
FIG. 8A is a graph of kurtosis measurement of the rotating equipment vs. time, in accordance with the techniques described herein.
Figures 9A, 9B:
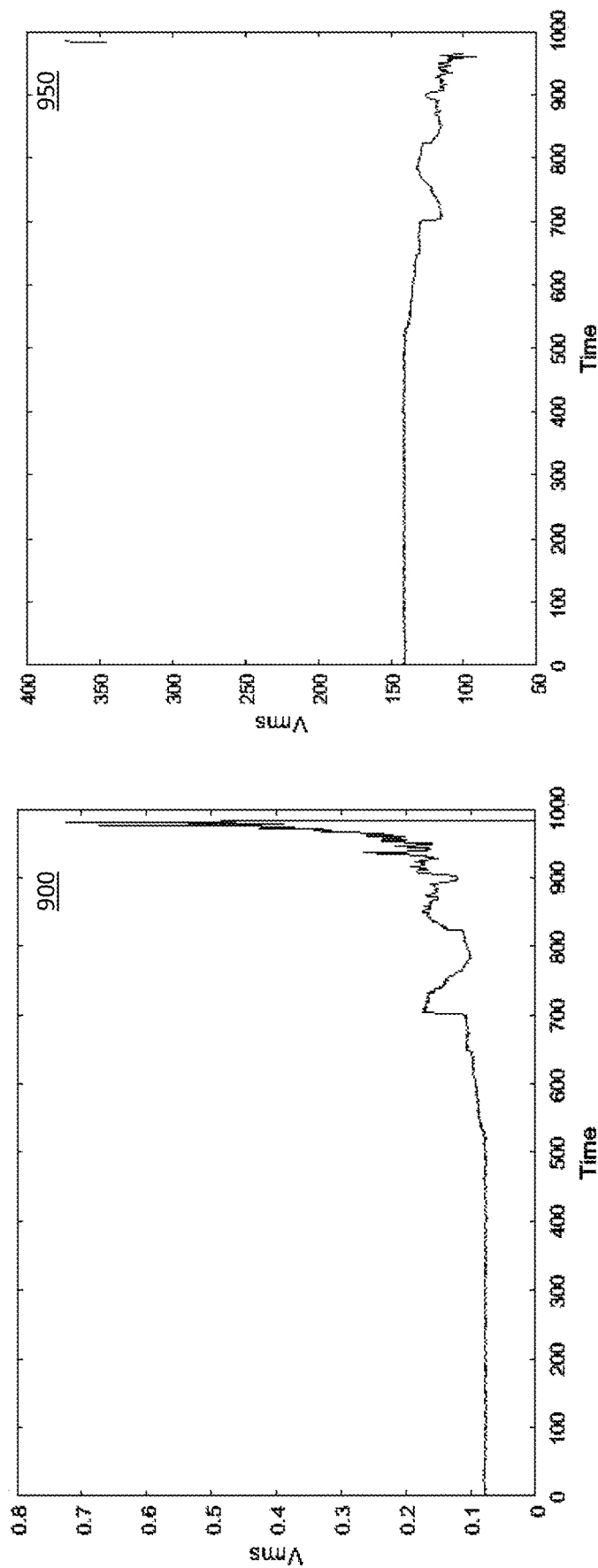
FIG. 9A is a graph of RMS measurement of the rotating equipment vs. time, in accordance with the techniques described herein.
FIG. 9B is a graph of fitted RMS measurement of the rotating equipment vs. time, in accordance with the techniques described herein.

The graphs 800 and 900 shown in FIGS. 8A and 9A, respectively, show real measurement values (e.g., exemplary measurement data) of extracted statistical features (kurtosis and RMS) on the Y-axis and time on the X-axis. The graphs 850 and 950 shown in FIGS. 8B and 9B, respectively, show fitted measurement values of the extracted statistical features (kurtosis and RMS) on the Y-axis and time on the X-axis. The graphs 800 and 900 show kurtosis and RMS values at various inspection points of a rotating equipment. The kurtosis and RMS values can be correlated with degradation of the rotating equipment. The exemplary measurement data taken from the rotating equipment at various inspection points usually has external noise (e.g., noise generated by motor fan or bearings) which may be irrelevant to degradation of the rotating equipment. So as to reduce the effects of the external noise, the Weibull hazard rate function (in equation (26)) is used to fit the exemplary measurement data, which is collected from the rotating equipment. The graphs 850 and 950 show fitted kurtosis and RMS values that can be correlated with degradation of the rotating equipment. The fitted measurement values are used as inputs to the WNN instead of real measurement values, so as to better represent the deterioration of the rotating equipment. The graphs 850 and 950 provide a better indication of the degradation of the rotating equipment compared to the graphs 800 and 900.

In order to evaluate the accuracy of prognosis model, sample data sets were collected from an experimental set up of a test rig (not shown). The test rig had four bearings that were installed on a shaft. The four bearings are: bearing 1, bearing 2, bearing 3, and bearing 4. On each bearing, two accelerometers were installed in which one is at the vertical axis Y and other is at the horizontal axis X. The two accelerometers were used to collect the vibration data of each bearing in the X and Y directions. The rotation speed of the shaft was kept constant at 2000 rpm by an AC motor coupled to the shaft. A radial load of 6000 lbs was applied onto the shaft and a bearing by a spring mechanism. All failures occurred after exceeding designed life time of the bearing which is more than 100 million revolutions. Two data sets were extracted from the experimental setup of the test rig. Each data set described a test-to-failure experiment. Each data set had vibration signals from each bearing. The vibration signals were collected for every 10 minutes with the sampling rate of 20 kHz. In first data set, outer race failure occurred in the bearing 3 at the end of the test-to-failure experiment. It took about 750 hours until the bearing 3 failed. In second data set, outer race failure occurred in the bearing 1 at the end of test-to-failure experiment of the test rig. It took about 164 hours until the bearing 3 failed.

The first data set was used as a training set for a wavelet neural network (WNN). The WNN of three layers with wavelet basis function as an activation function was trained with first data set. The WNN model used time and Weibull hazard rates of RMS, kurtosis, and peak from present and previous inspection points as input and normalized life percentage as output for the WNN. Mean square error (MSE) was calculated to identify difference between predicted value of life percentage of the bearing 3 and actual value of life percentage of the bearing 3. The WNN was trained using Levenberg-Marquardt (LM) learning algorithm. The proposed WNN gave minimum MSE error for the training set with two neurons on hidden layer.

The trained WNN was used to check the second data set to determine accuracy of the prediction by the WNN. To predict RUL of bearing 1 at time t, the collected vibration signals at current and previous inspections t−1 and t were pre-processed using EEMD algorithm to de-noise the vibration signals. RMS, kurtosis, and peak values were extracted from the vibration signals at the time instances t−1 and t. For predicting RUL of the bearing 1 at time t, 8 input values were fed into the WNN. The 8 input values were: (a) t and t−1, which were the time values at the current and previous inspections, respectively, (b) $X_{KURTOSIS}$ (t) and $X_{KURTOSIS}$ (t−1), which were kurtosis values of fitted measurements at the current and previous inspections, respectively, (c) $X_{RMS}$ (t) and $X_{RMS}$ (t−1), which were RMS values of fitted measurements at the current and previous inspections, respectively, and (d) $X_{PEAK}(t)$ and $X_{PEAK}(t-1)$, which were peak values of fitted measurements at the current and previous inspections, respectively. The output of the WNN was the normalized life percentage of the bearing 1.

Figure 10:
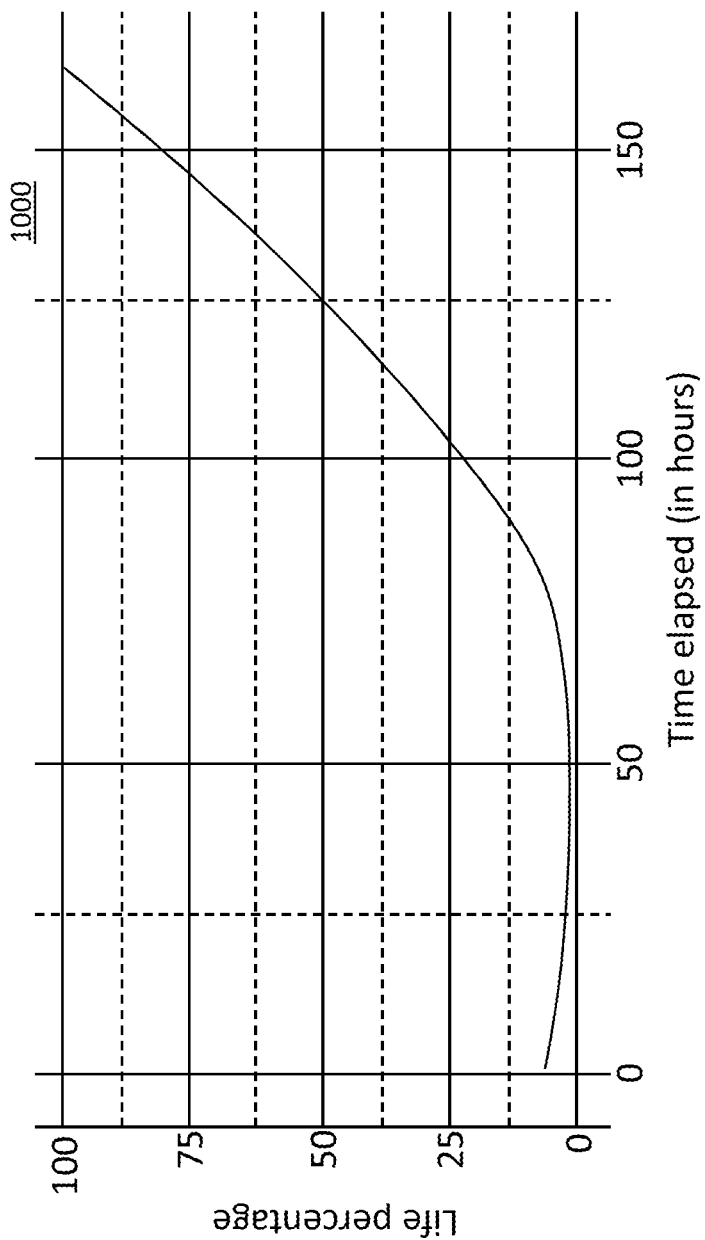
FIG. 10 is a graph of life percentage of a bearing vs. time, in accordance with the techniques described herein.

A graph 1000 of life percentage of the bearing 1 at various time instances vs. time elapsed was plotted based on output values of the WNN. The graph 1000 shown in FIG. 10 represents life percentage of the bearing 1 on the Y-axis and time elapsed (in hours) on the X-axis. When the life percentage of the bearing 1 reached 100%, the time elapsed was about 163 hours. From the results, it showed that the proposed WNN gave good performance in predicting RUL of the bearing 1. The accuracy of the prediction of RUL of the bearing 1 was more than 99%.

In the system environment 100, the server 106 can predict the RUL of the rotating equipment 102 with accuracy of more than 99%. The increased accuracy is achieved by the use of combination of the EEMD algorithm and the WNN. The accurate RUL of the rotating equipment 102 improves the reliability and cost of maintenance.

The present technique uses a set of statistical features to predict the remaining life of the rotating equipment 102. The statistical features include a combination of time-domain and frequency-domain features. The combination of the time-domain and frequency-domain features considers both early-stage and late-stage faults. This helps achieve better accuracy in prediction of the RUL of the rotating equipment 102. The system allows pre-processing of the digital signals prior to storage of the digital signals in the database. The present technique uses a unique combination of the EEMD algorithm and the WNN to predict the RUL of the rotating equipment 102. Moreover, the present technique attains a prediction of the RUL of the rotating equipment 102 with accuracy of more than 99%. The user experience is enhanced with the use of seamless blink up technology for easy connectivity of the wireless sensor 104 to the server 106.

As used in the specification and claims, the singular forms "a", "an" and "the" may also include plural references. For example, the term "an article" may include a plurality of articles. Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present techniques. There may be additional components described in the foregoing application that are not depicted on one of the described drawings. In the event such a component is described, but not depicted in a drawing, the absence of such a drawing should not be considered as an omission of such design from the specification.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

References to "one embodiment", "some embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in some embodiment" does not necessarily refer to the same embodiment.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A system for monitoring a rotating equipment, the system comprising:
   a sensor, positioned in proximity of the rotating equipment, configured to:
   sense vibrations of the rotating equipment;
   establish a wireless connection with a communication network via a communicator of the sensor, wherein the communicator of the sensor is configured to establish the wireless connection using one or more configuration parameters, and wherein the one or more configuration parameters are obtained from an external computing device via a line-of-sight communication channel;
   generate digital signals corresponding to the vibrations at a first time instance and a second time instance; and
   transmit the digital signals; and
   a server in communication with the sensor via the communication network, configured to:
   receive, from the sensor over the communication network, the digital signals;
   determine a plurality of intrinsic mode functions based on the digital signals;
   select a set of intrinsic mode functions from the plurality of intrinsic mode functions;
   extract a set of features from the set of intrinsic mode functions, wherein the set of features comprise at least first peak values of the set of intrinsic mode functions in a time domain at the first time instance and second peak values of the set of intrinsic mode functions in the time domain at the second time instance;
   apply the set of features including at least the first peak values and the second peak values and time values at the first time instance and the second time instance, as input values, to a wavelet neural network, wherein the wavelet neural network comprises at least a wavelet basis function configured to be used as an activation function for the first peak values at the first time instance and the second peak values at the second time instance; and
   predict life percentage of the rotating equipment using output generated by the wavelet neural network.

2. The system of claim 1, wherein the server is further configured to display remaining useful life of the rotating equipment on a user interface of a user device, wherein the remaining useful life is determined based on the life percentage.

3. The system of claim 1, wherein the server is configured to select the set of intrinsic mode functions by computing a mean and a standard deviation of kurtosis values of each of the plurality of intrinsic mode functions.

4. The system of claim 1, wherein the sensor is a microelectromechanical system (MEMS) based sensor.

5. The system of claim 1, wherein the sensor comprises a microcontroller to convert a vibration signal to the digital signal.

6. The system of claim 1, wherein an intrinsic mode function of the plurality of intrinsic mode functions is an oscillatory mode embedded in the digital signal.

7. A method for monitoring a rotating equipment, the method comprising, at one or more processors:
   establishing a wireless communication with a communicator of a sensor positioned in proximity of the rotating equipment;
   receiving, from the communicator of the sensor, digital signals corresponding to vibrations of the rotating equipment at a first time instance and a second time instance;
   determining a plurality of intrinsic mode functions from the digital signals;
   selecting a set of intrinsic mode functions from the plurality of intrinsic mode functions;
   extracting a set of features from the set of intrinsic mode functions, wherein the set of features comprise at least first peak values of the set of intrinsic mode functions in time domain at the first time instance and second peak values of the set of intrinsic mode functions in time domain at the second time instance;
   applying the set of features and time values at the first time instance and the second time instance, as input values to a wavelet neural network, wherein the wavelet neural network comprises at least a wavelet basis function configured to be used as an activation function for the first peak values at the first time instance and the second peak values at the second time instance; and
   predicting life percentage of the rotating equipment using output generated by the wavelet neural network.

8. The method of claim 7, further comprising displaying remaining useful life of the rotating equipment on a user interface of a user device, wherein the remaining useful life is determined based on the life percentage.

9. The method of claim 7, further comprising computing a mean and a standard deviation of kurtosis values of each of the plurality of intrinsic mode functions for selecting the set of intrinsic mode functions.

10. The method of claim 7, wherein an intrinsic mode function of the plurality of intrinsic mode functions is an oscillatory mode embedded in the digital signal.

11. The method of claim 7, wherein the set of features comprises a combination of time-domain features and frequency-domain features.

12. A system for monitoring a rotating equipment, the system comprising:
   a receiver configured to:
   establish a wireless communication with a communicator of a sensor positioned in proximity of the rotating equipment; and
   receive digital signals from the communicator of the sensor, wherein the digital signals correspond to vibrations of the rotating equipment at a first time instance and a second time instance; and at least one processor communicatively coupled to the receiver, wherein the at least one processor is configured to:
  decompose the digital signals into a plurality of intrinsic mode functions;
  select a set of intrinsic mode functions from the plurality of intrinsic mode functions;
  extract a set of features from the set of intrinsic mode functions, wherein the set of features comprise at least first peak values of the set of intrinsic mode functions in time domain at the first time instance and second peak values of the set of intrinsic mode functions in time domain at the second time instance;
  apply the set of features as input values to a wavelet neural network, wherein the wavelet neural network comprises at least a wavelet basis function configured to be used as an activation function for the first peak values at the first time instance and the second peak values at the second time instance; and
  predict life percentage of the rotating equipment using output generated by the wavelet neural network.

13. The system of claim 12, wherein the at least one processor is further configured to display remaining useful life of the rotating equipment on a user interface of a user device, wherein the remaining useful life is determined based on the life percentage.

14. The system of claim 13, wherein the system further comprises a transmitter, communicatively coupled to the at least one processor, for transmitting the remaining useful life of the rotating equipment to a user device.

15. The system of claim 12, wherein an intrinsic mode function of the plurality of intrinsic mode functions is an oscillatory mode embedded in the digital signal.

16. The system of claim 12, wherein the at least one processor is configured to select the set of intrinsic mode functions by computing a mean and a standard deviation of kurtosis values of each of the plurality of intrinsic mode functions.

17. The system of claim 12, wherein the set of features comprises a combination of time-domain features and frequency-domain features.

* * * * *